(12) United States Patent
Safavi-Naeini

(10) Patent No.: US 12,271,783 B2
(45) Date of Patent: Apr. 8, 2025

(54) CONTROL CIRCUIT COMPRISING SYMMETRIC ASYMMETRIC THREADED SUPERCONDUCTING QUANTUM INTERFERENCE DEVICES (SYMMETRIC ATSs)

(71) Applicant: Amazon Technologies, Inc., Seattle, WA (US)

(72) Inventor: Amir H. Safavi-Naeini, Palo Alto, CA (US)

(73) Assignee: Amazon Technologies, Inc., Seattle, WA (US)

(*) Notice: Subject to any disclaimer, the term of this patent is extended or adjusted under 35 U.S.C. 154(b) by 659 days.

(21) Appl. No.: 17/547,146

(22) Filed: Dec. 9, 2021

(65) Prior Publication Data

US 2023/0186132 A1    Jun. 15, 2023

(51) Int. Cl.
   *G06N 10/40*  (2022.01)
   *G06N 10/20*  (2022.01)

(52) U.S. Cl.
   CPC ............ *G06N 10/40* (2022.01); *G06N 10/20* (2022.01)

(58) Field of Classification Search
   USPC .......................................... 716/100, 101, 102
   See application file for complete search history.

(56) References Cited

U.S. PATENT DOCUMENTS

2022/0156441 A1* 5/2022 Campbell ............ H03K 19/195

OTHER PUBLICATIONS

Sergey Bravyi, et al., "Quantum Codes on a Lattice with Boundary," ArXiv Preprint: arXiv:quant-ph/9811052, 1998 pp. 1-6.
J. O'Gorman and E. T. Campbell, "Quantum Computation with Realistic Magic State Factories," Physical Review A 95, 032338 (2017), arXiv:1605.07197, pp. 1-22.
M. Motta, E. Ye, J. R. McClean, Z. Li, A. J. Minnich, R. Babbush, and G. K.-L. Chan, "Low rank representations for quantum simulation of electronic structure," (2018), arXiv:1808.02625, pp. 1-8.
C. Gidney and M. Ekera, "How to factor 2048 bit RSA integers in 8 hours using 20 million noisy qubits" (2019), arXiv:1905.09749 [quant-ph], pp. 1-31.
E. Campbell, A. Khurana, and A. Montanaro, "Applying Quantum Algorithms to Constraint Satisfaction Problems," Quantum 3, 167 (2019), arXiv:1810.05582, pp. 1-30.

(Continued)

*Primary Examiner* — Brian Ngo
(74) *Attorney, Agent, or Firm* — Alexander A. Knapp; Kowert, Hood, Munyon, Rankin & Goetzel, P.C.

(57) ABSTRACT

A fault tolerant quantum computer is implemented using hybrid acoustic-electric qubits or electromagnetic qubits, as a few examples. A control circuit includes symmetrically arranged asymmetrically threaded superconducting quantum interference devices (ATSs) that excite phonons in a resonator by driving a storage mode of the resonator and dissipate phonons from the resonator via an open transmission line coupled to the control circuit, wherein the open transmission line is configured to absorb photons from a dump mode of the control circuit. The symmetric ATSs are arranged such that undesirable terms in respective Hamiltonians for the ATSs individually, cancel each other out when combined in the symmetric configuration.

20 Claims, 10 Drawing Sheets

(56) References Cited

OTHER PUBLICATIONS

D. Kivlichan, C. Gidney, D. W. Berry, N. Wiebe, J. McClean, W. Sun, Z. Jiang, N. Rubin, A. Fowler, A. Aspuru-Guzik, and et al., "Improved Fault-Tolerant Quantum Simulation of Condensed-Phased Correlated Electrons via Trotterization," Quantum 4, 296 (2020), arXiv:1902.10673, pp. 1-45.

D. K. Tuckett, S. D. Bartlett, and S. T. Flammia, "Ultrahigh Error Threshold for Surface Codes with Biased Noise," Phys. Rev. Lett. 120, 050505 (2018), arXiv: 1708.08474, pp. 1-6.

D. K. Tuckett, A. S. Darmawan, C. T. Chubb, S. Bravyi, S. D. Bartlett, and S. T. Flammia, "Tailoring Surface Codes for Highly Biased Noise," Phys. Rev. X 9, 041031 (2019), arXiv:1812.08186, pp. 1-22.

D. K. Tuckett, S. D. Bartlett, S. T. Flammia, and B. J. Brown, "Fault-Tolerant Thresholds for the Surface Code in Excess of 5% Under Biased Noise," Phys. Rev. Lett. 124, 130501 (2020), arXiv:1907.02554, pp. 1-10.

J. P. Bonilla Ataides, D. K. Tuckett, S. D. Bartlett, S. T. Flammia, and B. J. Brown, "The XZZX surface code," (2020), arXiv:2009.07851 [quant-ph], pp. 1-16.

P. Aliferis and J. Preskill, "Fault-Tolerant Quantum Computation Against Biased Noise," Phys. Rev. A 78, 052331 (2008), arXiv:0710.1301, pp. 1-9.

S. Puri, L. St-Jean, J. A. Gross, A. Grimm, N. E. Frattini, P. S. Iyer, A. Krishna, S. Touzard, L. Jiang, A. Blais, and et al., "Bias-Preserving Gates with Stabilized CAT Quibits," Science Advances 6, eaay5901 (2020), arXiv:1905.00450, pp. 1-25.

J. Guillaud and M. Mirrahimi, "Repetition Cat Qubits for Fault-Tolerant Quantum Computation," Phys. Rev. X 9, 041053 (2019), arXiv:1904.09474, pp. 1-23.

J. Guillaud and M. Mirrahimi, "Error Rates and Resource Overheads of Repetition Cat Qubits," (2020), arXiv:2009.10756 [quant-ph], pp. 1-17.

M. Mirrahimi, Z. Leghtas, V. V. Albert, S. Touzard, R. J. Schoelkopf, L. Jiang, and M. H. Devoret, "Dynamically Protected Cat-Qubits: A New Paradigm for Universal Quantum Computation," New Journal of Physics 16, 045014 (2014), pp. 1-31.

S. Puri, S. Boutin, and A. Blais, "Engineering the Quantum States of Light in a Kerr-nonlinear Resonator by Two-Photon Driving," NPJ Quantum Inf. 3, 18 (2017), pp. 1-7.

J. Cohen, "Autonomous quantum error correction with superconducting qubits," Ph.D. thesis, Universite Paris sciences et lettres (2017), HAL archives-ouvertes.fr, pp. 1-164.

V. V. Albert, K. Noh, K. Duivenvoorden, D. J. Young, R. T. Brierley, P. Reinhold, C. Vuillot, L. Li, C. Shen, S. M. Girvin, B. M. Terhal, and L. Jiang, "Performance and Structure of Single-Mode Bosonic Codes," Phys. Rev. A 97, 032346 (2018), pp. 1-30.

A. Joshi, K. Noh, and Y. Y. Gao, "Quantum Information Processing with Bosonic Qubits in Circuit QED," arXiv e-prints, arXiv:2008.13471 (2020), arXiv:2008.13471 [quant-ph], pp. 1-26.

W. Cai, Y. Ma, W. Wang, C. L. Zou, and L. Sun, "Bosonic Quantum Error Correction Codes in Superconducting Quantum Circuits," arXiv e-prints, arXiv:2010.08699 (2020), arXiv:2010.08699 [quant-ph], pp. 1-23.

Z. Leghtas, S. Touzard, I. M. Pop, A. Kou, B. Vlastakis, A. Petrenko, K. M. Sliwa, A. Narla, S. Shankar, M. J. Hatridge, M. Reagor, L. Frunzio, R. J. Schoelkopf, M. Mirrahimi, and M. H. Devoret, "Confining the State of Light to a Quantum Manifold by Engineered Two-Photon Loss," Science 347, 853 (2015), 1412.4633, pp. 853-857.

S. Touzard, A. Grimm, Z. Leghtas, S. Mundhada, P. Reinhold, C. Axline, M. Reagor, K. Chou, J. Blumo, K. Sliwa, and et al., "Coherent Oscillations inside a Quantum Manifold Stabilized by Dissipation," Physical Review X 8, 021005 (2018), arXiv:1705.02401, pp. 1-7.

S. Puri, A. Grimm, P. Campagne-Ibarcq, A. Eickbusch, K. Noh, G. Roberts, L. Jiang, M. Mirrahimi, M. H. Devoret, and S. M. Girvin, Stabilized Cat in a Driven Nonlinear Cavity: A Fault-Tolerant Error Syndrome Detector, Phys. Rev. X 9, 041009 (2019), pp. 1-29.

A. Grimm, N. E. Frattini, S. Puri, S. O. Mundhada, S. Touzard, M. Mirrahimi, S. M. Girvin, S. Shankar, and M. H. Devoret, "Stabilization and Operation of a Kerr-cat qubit," Nature 584, 205 (2020), arXiv:1907.12131, pp. 1-7.

R. Lescanne, M. Villiers, T. Peronnin, A. Sarlette, M. Delbecq, B. Huard, T. Kontos, M. Mirrahimi, and Z. Leghtas, "Exponential Suppression of bit-flips in a Qubit Encoded in an Oscillator," Nature Physics 16, 509 (2020), pp. 1-18.

F. Mac Williams and N. Sloane, "The Theory of Error-Correcting Codes," BOOK, (North Holland, 1988), pp. 1-770.

G. S. MacCabe, H. Ren, J. Luo, J. D. Cohen, H. Zhou, A. Sipahigil, M. Mirhosseini, and O. Painter, "Phononic Bandgap Nano-acoustic Cavity with Ultralong Phonon Lifetime," Science 370, 840 (2020), pp. 1-43.

P. Arrangoiz-Arriola, E. A. Wollack, Z. Wang, M. Pechal, W. Jiang, T. P. McKenna, J. D. Witmer, R. Van Laer, and A. H. Safavi-Naeini, "Resolving the energy levels of nanomechanical oscillator," Nature vol. 571, 537 (2019), pp. 1-11.

E. A. Wollack, A. Y. Cleland, P. Arrangoiz-Arriola, T. P. McKenna, R. G. Gruenke, R. N. Patel, W. Jiang, C. J. Sarabalis, and A. H. Safavi-Naeini, "Loss channels affecting lithium niobate phononic crystal resonators at cryogenic temperature," (2020), arXiv:2010.01025 [physics.appph], pp. 1-15.

S. Bravyi and J. Haah, "Magic-state distillation with low overhead," CORE, Phys. Rev. A 86, 052329 (2012 American Physical Society), pp. 1-10.

A. M. Meier, B. Eastin, and E. Knill, "Magic-State Distillation with the Four-Qubit Code," Quant. Inf. and Comp. 13, 195 (2013), pp. 1-10.

E. T. Campbell and M. Howard, "Magic state parity-checker with pre-distilled components," Quantum 2, 56 (2018), pp. 1-19.

S. Bravyi and A. Kitaev, "Universal Quantum Computation with Ideal Clifford Gates and Noisy Ancillas," CORE, Phys. Rev. A 71, 022316 (2005 American Physical Society), pp. 1-14.

J. P. Paz and W. H. Zurek, "Continuous Error Correction," Proceedings of the Royal Society of London. Series A: Mathematical, Physical and Engineering Sciences 454, pp. 355-364 (1998).

C. Ahn, A. C. Doherty, and A. J. Landahl, "Continuous Quantum Error Correction via Quantum Feedback Control," Phys. Rev. A 65, 042301 (2002), pp. 1-10.

M. Sarovar and G. J. Milburn, "Continuos Quantum Error Correction by Cooling," Phys. Rev. A 72, 012306 (2005), pp. 1-7.

P. T. Cochrane, G. J. Milburn, and W. J. Munro, "Macroscopically Distinct Quantum Superposition States as a Bosonic Code for Amplitude Damping," Phys. Rev. A 59, 2631 (1999), pp. 1-5.

H. Jeong and M. S. Kim, Phys. "Efficient Quantum Computation Using Coherent States," Rev. A 65, 042305 (2002 The American Physical Society), pp. 1-6.

F. Reiter and A. S. Srensen, "Effective Operator Formalism for Open Quantum Systems," Phys. Rev. A 85, 032111 (2012), pp. 1-11.

N. E. Frattini, U. Vool, S. Shankar, A. Narla, K. M. Sliwa, and M. H. Devoret, "3-Wave Mixing Josephson Dipole Element," Applied Physics Letters 110, 222603 (2017), https://doi.org/10.1063/1.4984142, pp. 1-5.

M. Mirhosseini, A. Sipahigil, M. Kalaee, and O. Painter, "Quantum transduction of optical photons from a superconducting qubit," (2020), arXiv:2004.04838 [quant-ph], pp. 1-17.

R. Lescanne, L. Verney, Q. Ficheux, M. H. Devoret, B. Huard, M. Mirrahimi, and Z. Leghtas, "Escape of a Driven Quantum Josephson Circuit into Unconfined States," Phys. Rev. Applied 11, 014030 (2019), pp. 1-12.

D. Sank, Z. Chen, M. Khezri, J. Kelly, R. Barends, B. Campbell, Y. Chen, B. Chiaro, A. Dunsworth, A. Fowler, E. Jerey, E. Lucero, A. Megrant, J. Mutus, M. Neeley, C. Neill, P. J. J. O'Malley, C. Quintana, P. Roushan, A. Vainsencher, T. White, J. Wenner, A. N. Korotkov, and J. M. Martinis, "Measurement-Induced State Transitions in a Superconducting Qubit: Beyond the Rotating Wave Approximation," Phys. Rev. Lett. 117, 190503 (2016), pp. 1-10.

(56) References Cited

OTHER PUBLICATIONS

Y. Zhang, B. J. Lester, Y. Y. Gao, L. Jiang, R. J. Schoelkopf, and S. M. Girvin, "Engineering Bilinear Mode Coupling in Circuit QED: Theory and Experiment," Phys. Rev. A 99, 012314 (2019 American Physical Society), pp. 1-39.
L. Verney, R. Lescanne, M. H. Devoret, Z. Leghtas, and M. Mirrahimi, "Structural Instability of Driven Josephson Circuits Prevented by an Inductive Shunt," Phys. Rev. Applied 11, 024003 (2019 American Physical Society), pp. 1-12.
D. F. V. James and J. Jerke, Can. J. "Effective Hamiltonian Theory and Its Applications in Quantum Information," Phys. 35, 625 (2007), pp. 1-5.
D. Gamel and D. F. V. James, "Time Averaged Quantum Dynamics and The Validity of the Effective Hamiltonian Model," Phys. Rev. A 82, 052106 (2010), pp. 1-8.
R. K. Naik, N. Leung, S. Chakram, P. Groszkowski, Y. Lu, N. Earnest, D. C. McKay, J. Koch, and D. I. Schuster, "Random Access Quantum Information Processors Using Multimode Circuit Quantum Electrodynamics," Nature Communications 8, 1904 (2017), pp. 1-7.
M. Pechal, P. Arrangoiz-Arriola, and A. H. Safavi-Naeini, "Superconducting Circuit Quantum Computing with Nanomechanical Resonators as Storage," Quantum Science and Technology. 4, 015006 (2018), pp. 1-10.
C. T. Hann, C.-L. Zou, Y. Zhang, Y. Chu, R. J. Schoelkopf, S. M. Girvin, and L. Jiang, "Hardware-Efficient Quantum Random Access Memory with Hybrid Quantum Acoustic Systems," Phys. Rev. Letters 123, 250501 (2019 American Physical Society), pp. 1-7.
P. Mundada, G. Zhang, T. Hazard, and A. Houck, "Suppression of Qubit Crosstalk ina Tunable Coupling Superconducting Circuit," Phys. Rev. Appl. 12, 10.1103/PhysRevApplied.12.054023, pp. 1-11, (2019).
Y. Chen, C. Neill, P. Roushan, N. Leung, M. Fang, R. Barends, J. Kelly, B. Campbell, Z. Chen, B. Chiaro, A. Dunsworth, E. Je rey, A. Megrant, J. Y. Mutus, P. J. J. O'Malley, C. M. Quintana, D. Sank, A. Vainsencher, J. Wenner, T. C. White, M. R. Geller, A. N. Cleland, and J. M. Martinis, "Qubit Architecture with High Coherence and Fast Tunable Coupling," Phys. Rev. Letters 113, 220502 (2014 American Physical Society), pp. 1-5.
L. Sun, A. Petrenko, Z. Leghtas, B. Vlastakis, G. Kirchmair, K. Sliwa, A. Narla, M. Hatridge, S. Shankar, J. Blumo, et al., "Tracking Photon Jumps ith Repeated Quantum Non-Demolition Parity Measurements," Nature 511, 444 (2014), pp. 1-20.
C. T. Hann, S. S. Elder, C. S. Wang, K. Chou, R. J. Schoelkopf, and L. Jiang, "Robust Readout of Bosonic Qubits in the Dispersive Coupling Regime," Phys. Rev. A 98, 022305 (2018 American Physical Society), pp. 1-13.
S. S. Elder, C. S. Wang, P. Reinhold, C. T. Hann, K. S. Chou, B. J. Lester, S. Rosenblum, L. Frunzio, L. Jiang, and R. J. Schoelkopf, "High-Fidelity Measurement of Qubits Encoded in Multilevel Superconducting Circuits," Phys. Rev. X 10, 011001 (2020 American Physical Society), pp. 1-10.
N. Didier, J. Bourassa, and A. Blais, Fast Quantum Nondemolition Readout by Parametric Modulation of Longitudinal Qubit-Oscillator Interaction, Phys. Rev. Letters, 115, 203601 (2015 American Physical Society), pp. 1-5.
A. A. Clerk, M. H. Devoret, S. M. Girvin, F. Marquardt, and R. J. Schoelkopf, "Introduction to Quantum Noise, Measurement and Amplification," Rev. Mod. Phys. 82, 1155 (2010), pp. 1-96.
P. Krantz, M. Kjaergaard, F. Yan, T. P. Orlando, S. Gustavsson, and W. D. Oliver, "A Quantum Engineer's Guide to Superconduction Qubits," Applied Physics Reviews 6, 021318 (2019), pp. 1-58.
Y. Tomita and K. M. Svore, "Low-Distance Surface Codes under Realistic Quantum Noise," Physical Review A 90, 062320 (2014), arXiv preprint: arXiv:1404.3747v1, pp. 1-14.
D. P. DiVincenzo and P. Aliferis, Effective Fault-Tolerant Quantum Computation with Slow Measurements, CORE, Phys. Rev. Letters 98, 020501 (2007), pp. 1-10.

C. Chamberland, P. Iyer, and D. Poulin, "Fault-tolerant Quantum Computing int he Pauli or Clifford Frame with Slow Error Diagnostics," Quantum 2, 43 (2018), pp. 1-11.
J. Kelly, R. Barends, A. G. Fowler, A. Megrant, E. Jeffrey, T. C. White, D. Sank, J. Y. Mutus, B. Campbell, Y. Chen, et al., "State Preservation by Repetitive Error Detection in a Superconducting Quantum Circuit," Nature 519, 66 (2015), pp. 1-30.
C. Horsman, A. G. Fowler, S. Devitt, and R. V. Meter, "Surface Code Quantum Computing by Lattice Surgery," IOP Institute of Physics, New Journal of Physics 14, 123011 (2012), pp. 1-28.
A. J. Landahl and C. Ryan-Anderson, "Quantum Computing by Color-Code Lattice Surgery," arXiv preprint arXiv:1407.5103 (2014), pp. 1-13.
D. Litinski and F. v. Oppen, "Lattice Surgery with a Twist: Simplifying Clifford Gates of Surface Codes," Quantum 2, 62 (2018), arXiv Preprint arXiv:1709.02318v2, pp. 1-16.
D. Litinski, "A Game of Surface Codes: Large-Scale Quantum Computing with Lattice Surgery," Quantum 3, 128 (2019), arXiv Preprint arXiv:1808.02892v3, pp. 1-37.
A. Kubica, B. Yoshida, and F. Pastawski, "Unfolding the Color Code," IOP Institute of Physics, New Journal of Physics 17, 083026 (2015), pp. 1-27.
S. Bravyi, G. Smith, and J. A. Smolin, "Trading Classical and Quantum Computational Resources," Physical Review X 6, 021043 (2016), arXiv Preprint arXiv:1506.01396v1, pp. 1-14.
A. Paler and A. G. Fowler, "OpenSurgery for Topical Assemblies," arXiv preprint arXiv:1906.07994 (2019), pp. 1-4.
A. G. Fowler, M. Mariantoni, J. M. Martinis, and A. N. Cleland, "Surface Codes: Towrads Practical Large-Scale Quantum Computation," Phys. Rev. A 86, 032324 (2012 American Physical Society), pp. 1-48.
A. G. Fowler, "Time-Optimal Quantum Computation," arXiv preprint arXiv:1210.4626 (2012), pp. 1-5.
C. Chamberland and A. W. Cross, "Fault-Tolerant Magic State Preparation with Flag Qubits," Quantum 3, 143 (2019), arXiv preprint arXiv:1811.00566v2, pp. 1-26.
C. Chamberland and K. Noh, "Very Low Overhead Fault-Tolerant Magic State Preparation Using Redundant Ancilla Encoding and Flag Quibits," NPJ Quantum Information 6, 91 (2020), arXiv preprint arXiv:2003.03049v1, pp. 1-27.
J. Haah, M. B. Hastings, D. Poulin, and D. Wecker, Magic State Distillation with Low Space Overhead and Optimal Asymptotic Input Count, Quantum 1, 31 (2017), arXiv preprint arXiv:1703.07847v3), pp. 1-42.
A. Paetznick and B. W. Reichardt, "Universal Fault-Tolerant Quantum Computation with only Transversal Gates and Error Correction," Physical Review Letters 111, 090505 (2013), arXiv preprint arXiv:1304.3709v2, pp. 1-5.
M. Vasmer and D. E. Browne, "Three-Dimensional Surface Codes: Transversal Gates and Fault-Tolerant Architectures," Physical Review A 100, 012312 (2019 American Physical Society), arXiv preprint arXiv:1801.04255, 2018, pp. 1-20.
J. Haah and M. B. Hastings, "Codes and Protocols for Distilling T, Controlled-S, and Toffoli Gates," Quantum 2, 71 (2018), arXiv preprint arXiv:1709.02832v3, pp. 1-29.
D. Litinski, "Magic State Distillation: Not as Costly as You Think," Quantum 3, 205 (2019), arXiv preprint arXiv:1905.06903v3, pp. 1-22.
E. T. Campbell and M. Howard, "Unifying Gate-Synthesis and Magic State Distillation," Physical review letters 118, 060501 (2017), arXiv preprint arXiv:1606.0190v2, pp. 1-5.
N. Wiebe and C. Granade, "Efficient Bayesian Phase Estimation," Phys. Rev. Letters. 117, 010503 (2016), arXiv preprint arXiv:1508.00869v1, pp. 1-12.
C. Gidney, "Halving the Cost of Quantum Addition," Quantum 2, 74 (2018), arXiv preprint arXiv:1709.06648v3, pp. 1-6.
C. Gidney and A. G. Fowler, "Efficient Magic State Factories with Catalyzed |CCZ>-2|T> Transformation," Quantum 3, 135 (2019), arXiv preprint arXiv:1812.01238v3, pp. 1-24.
S. Bravyi, D. Browne, P. Calpin, E. Campbell, D. Gosset, and M. Howard, "Simulation of Quantum Circuits by Low- Rank Stabilizer Decompositions," Quantum 3, 181 (2019), arXiv preprint arXiv:1808.00128v2, pp. 1-48.

(56) References Cited

OTHER PUBLICATIONS

B.-X. Zheng, C.-M. Chung, P. Corboz, G. Ehlers, M.-P. Qin, R. M. Noack, H. Shi, S. R. White, S. Zhang, and G. K.- L. Chan, "Strip Order in the Underdoped Region of the Two-Dimensional Hubbard Model," Science 358, 1155 (2017), arXiv preprint arXiv:1701.00054v2, pp. 1-78.

M. Li, D. Miller, M. Newman, Y. Wu, and K. R. Brown, "2D Compass Codes," Phys. Rev. X 9, 021041 (2019 American Physical Society), pp. 1-11.

C. Chamberland, G. Zhu, T. J. Yoder, J. B. Hertzberg, and A. W. Cross, "Topological and Subsystem Codes on Low-Degree Graphs with Flag Quibits," Phys. Rev. X 10, 011022 (2020), arXiv preprint arXiv:1907.09528v2, pp. 1-21.

D. M. Debroy, M. Li, S. Huang, and K. R. Brown, "Logical Performance of 9 Quibit Compass COdes in Ion Traps with Crosstalk Errors," Quantum Science and Technology 5, 034002 (2020), arXiv preprint arXiv:1910.08495v2, pp. 1-12.

S. Huang and K. R. Brown, "Fault-Tolerant Compass Codes," Phys. Rev. A 101, 042312 (2020 American Physical Society), pp. 1-6.

P. Aliferis, D. Gottesman, and J. Preskill, "Quantum Accuracy Threshold for Concatenated Distance-3 Codes," Quantum Info. Comput. 6, 97 (2006), arXiv preprint arXiv:quant-ph/0504218v2, pp. 1-58.

S. E. Nigg, H. Paik, B. Vlastakis, G. Kirchmair, S. Shankar, L. Frunzio, M. H. Devoret, R. J. Schoelkopf, and S. M. Girvin, "Black-Box Superconducting Circuit Quantization," Phys. Rev. Letters 108, 240502 (2012 American Physical Society), pp. 1-5.

M. Pechal and A. H. Safavi-Naeini, "Millimeter-wave Interconnects for Microwave-Frequency Quantum Machines," Phys. Rev. A 96, 042305 (2017), arXiv preprint arXiv:1706.05368v1, pp. 1-14.

J. M. Kreikebaum, K. P. O'Brien, A. Morvan, and I. Siddiqi, "Improving Wafer-Scale Josephson Junction Resistance Variation in Superconducting Quantum Coherent Circuits," Superconductor Science and Technology 33, 06LT02 (2020), IOP Publishing, pp. 1-7.

V. S. Ferreira, J. Banker, A. Sipahigil, M. H. Matheny, A. J. Keller, E. Kim, M. Mirhosseini, and O. Painter, Collapse and Revival of an Artificial Atom Coupled to a Structured Photonic Reservoir (2020), arXiv:2001.03240 [quant-ph], pp. 1-19.

R. Azouit, A. Sarlette, and P. Rouchon, Adiabatic elimination for open quantum systems with effective Lindblad master equations (2016), arXiv:1603.04630 [quant-ph], pp. 1-9.

R. Azouit, F. Chittaro, A. Sarlette, and P. Rouchon, "Towards Generic Adiabatic Elimination for Bipartite Open Quantum Systems," Quantum Science Technology 2, 044011 (2017 IOP Publishing Ltd.), pp. 1-16.

E. A. Sete, J. M. Martinis, and A. N. Korotkov, "Quantum Theory of a Bandpass Purcell Filter for Qubit Readout," Phys. Rev. A 92, 012325 (2015 American Physical Society), pp. 1-13.

D. F. James and J. Jerke, "Effective Hamiltonian Theory and Its Applications in Quantum Information," Canadian Journal of Physics 85, 625 (2007), https://doi.org/10.1139/p07-060, pp. 1-5.

J. Heinsoo, C. K. Andersen, A. Remm, S. Krinner, T. Walter, Y. Salathe, S. Gasparinetti, J.-C. Besse, A. Potocnik, A. Wallra, and C. Eichler, "Rapid High-Fidelity Multiplexed Readout of Superconducting Qubits," Phys. Rev. Applied 10, 034040 (2018), arXiv prepint: arXiv:1801.07904v1, pp. 1-13.

E. Jeffrey, D. Sank, J. Y. Mutus, T. C. White, J. Kelly, R. Barends, Y. Chen, Z. Chen, B. Chiaro, A. Dunsworth, A. Megrant, P. J. J. O'Malley, C. Neill, P. Roushan, A. Vainsencher, J. Wenner, A. N. Cleland, and J. M. Martinis, "Fast Accurate State Measurement with Superconducting Qubits," Phys. Rev. Letters 112, 190504 (2014 American Physical Society), pp. 1-5.

\* cited by examiner

CONTROL CIRCUIT COMPRISING SYMMETRIC ASYMMETRIC THREADED SUPERCONDUCTING QUANTUM INTERFERENCE DEVICES (SYMMETRIC ATSs)

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects like photons, molecules, atoms, and electrons.

A quantum computer is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers, where the absolute value of the complex numbers must sum to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g., a traditional zero or one bit) and the qubit is that a probabilistic bit represents a lack of information about a two-level classical system, while a qubit contains maximal information about a two-level quantum system.

Quantum computers are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

A quantum algorithm is a reversible transformation acting on qubits in a desired and controlled way, followed by a measurement on one or multiple qubits. For example, if a system has two qubits, a transformation may modify four numbers; with three qubits this becomes eight numbers, and so on. As such, a quantum algorithm acts on a list of numbers exponentially large as dictated by the number of qubits. To implement a transform, the transform may be decomposed into small operations acting on a single qubit, or a set of qubits, as an example. Such small operations may be called quantum gates and the arrangement of the gates to implement a transformation may form a quantum circuit.

There are different types of qubits that may be used in quantum computers, each having different advantages and disadvantages. For example, some quantum computers may include qubits built from superconductors, trapped ions, semiconductors, photonics, etc. Each may experience different levels of interference, errors and decoherence. Also, some may be more useful for generating particular types of quantum circuits or quantum algorithms, while others may be more useful for generating other types of quantum circuits or quantum algorithms. Also, costs, run-times, error rates, error rates, availability, etc. may vary across quantum computing technologies.

For some types of quantum computations, such as fault tolerant computation of large-scale quantum algorithms, overhead costs for performing such quantum computations may be high. For example, for types of quantum gates that are not naturally fault tolerant, the quantum gates may be encoded in error correcting code. However, this may add to the overhead number of qubits required to implement the large-scale quantum algorithms. Also, performing successive quantum gates, measurement of quantum circuits, etc. may introduce probabilities of errors in the quantum circuits and/or measured results of the quantum circuits.

Figure 1A:
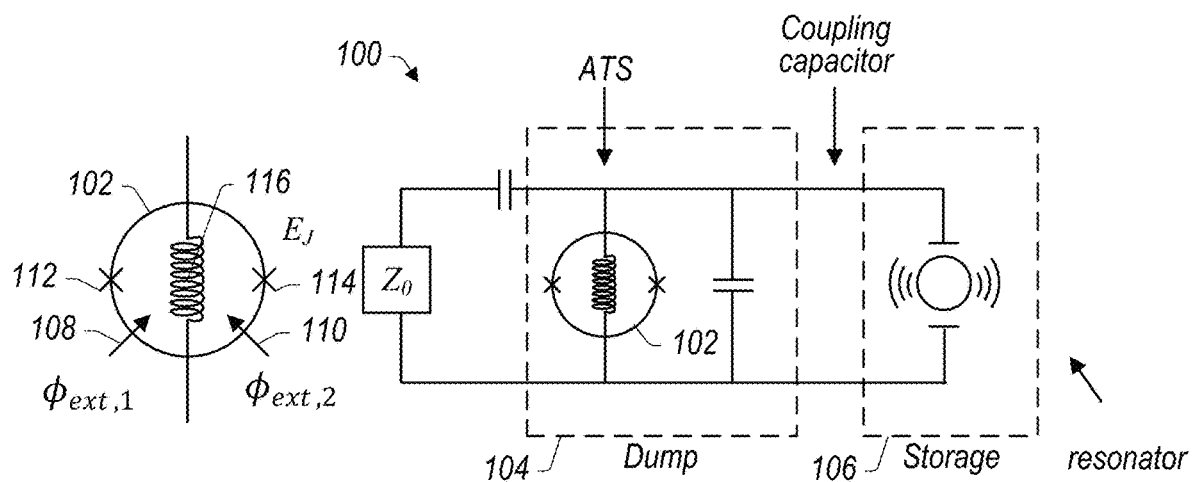
FIG. 1A illustrates a system comprising a resonator and an asymmetrically-threaded superconducting quantum interference device (ATS), according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for implementing control circuits for resonators that implement qubits of a quantum computing device. The control circuits are configured using symmetrically arranged ATSs (asymmetrically threaded SQUIDS (superconducting quantum interference devices)). Such qubits may be used to form quantum circuits, for example using gates of a universal gate set.

In some embodiments, efficiently implementing a universal gate set may involve multiple layers of a quantum computer/quantum algorithm. For example, at a lowest layer, building blocks of a quantum computer may include resonators, such as nano-mechanical resonators or electromagnetic resonators, that are controlled using a set of symmetrically arranged asymmetrically-threaded superconducting quantum interference device (asymmetrically-threaded SQUID or ATS). The resonators may be configured to resonate at one or more frequencies and may be coupled to the symmetric ATSs, wherein the symmetric ATSs control phonic modes. Also, the symmetric ATSs may be coupled to a bandpass filter and then an open transmission line that enables photons from the symmetric ATSs to be adsorbed by the environment. At a next level, error correction may be implemented for the quantum computer comprising resonators and symmetric ATSs. For example, error corrected codes may be built that utilize the ATSs and phononic modes of the nano-mechanical resonators to detect and/or correct errors. At yet another level, gates may be implemented for the quantum computer using the error corrected codes as inputs or outputs to the gates. Also, qubits of the gates may be error corrected. At yet a higher-level, logical gate may be built that utilize one or more of the physical gates. Note that while several of the protocols described herein are described in terms of a system that utilizes nano-mechanical resonators that implements hybrid acoustic-electrical qubits, in some embodiments other hardware types may be used, such as those that implement electromagnetic qubits.

In contrast to control circuits that utilize a single ATS, symmetrically arranged ATSs are arranged such that undesirable terms in a Hamiltonian describing the interactions generated by each of the respective ATSs are canceled out when the Hamiltonian terms are mixed in the control circuit comprising the symmetric ATSs. For example, FIGS. 3-5 further described below illustrates symmetric arrangements of ATSs that eliminate unwanted Hamiltonian terms.

Asymmetrically Threaded Superconducting Quantum Interference Device (ATS)-Phononic Hybrid System In some embodiments, a circuit for use in a quantum computer may comprise resonators, such as nano-mechanical linear resonators or electromechanical resonators as a few examples, and asymmetrically threaded superconducting quantum interference devices (SQUID, ATSs). The resonators and ATSs may implement qubits that are hybrid acoustic-electrical qubits or electromagnetic qubits. In some embodiments, both the resonators and ATSs may be situated on a same component and may provide for easily extending a system to include additional components with additional resonators that implement additional hybrid acoustic-electrical qubits or electromagnetic qubits. This may also enable scaling of a number of qubits needed for a quantum computer by including more or fewer components. Such an approach may allow for simpler extension and scaling than a system wherein components that implement qubits are integrated into a single chip, and newly designed chips are required to extend or scale the system to have more or fewer qubits. As used herein, the terms "mechanical", "acoustic", "phononic", etc. may be used to describe mechanical circuits.

In some embodiments, more phononic resonators (e.g., nano-mechanical resonators) may be connected to a same control circuit, such as a control circuit comprising symmetric ATSs, than is possible for electromagnetic resonators. This is due, at least in part, to the smaller size of the phononic resonators as compared to electromagnetic resonators. However, in such systems cross-talk between the phononic resonators coupled to the same control circuit must be addressed in order to avoid errors. Multiplexed control of phononic resonators using a common control circuit, such as a control circuit comprising symmetric ATSs, is further discussed in detail below.

In some embodiments, a structure of a chip comprising phononic resonators may take the form of a planar circuit with metal components that form superconducting circuits, such as the ATSs. The ATSs may be physically connected via wire leads to very small (e.g., micron-sized or nano-sized) suspended mechanical devices, such a linear nano-mechanical resonator. The suspended mechanical devices may be located on a same chip with an ATS circuit or may by located on a separate chip that has been heterogeneously integrated via a flip chip, or similar component, with a bottom chip comprising the ATS and/or additional suspended mechanical devices, e.g., other mechanical resonators.

In some embodiments, electrical connections to the ATS may be laid on top of a piezoelectric material that has been etched into a pattern to form the nano-mechanical resonators. In some embodiments, different variables, such as piezoelectric coefficient, density, etc. may affect how strongly coupled the ATS is to the mechanical resonators. This coupling may be expressed in terms of a phonon coupling rate in the Hamiltonian for the system.

When coupling a nano-structure, such as a nano-mechanical resonator, to an electrical circuit, very small capacitors are required since the nano-structure components, e.g., nano-mechanical resonators, are also very small. Typically, in an electrical circuit, such as an ATS circuit, there are other capacitances. Since the capacitor for the nano-structure is very small, these other capacitances in the circuit may lower the signal voltage and thus dilute a signal directed to one of the nano-components, such as a nano-mechanical resonator. However, to deal with this issue, a high-impedance inductor may be coupled in the control circuit between the ATS and the nano-mechanical resonator. The high-impedance inductor may have a very low parasitic capacitance, thus electrical fields directed at the nano-mechanical resonators may act on the nano-mechanical resonators with only minimal dilution due to capacitance of the inductor (e.g., parasitic capacitance). Also, the high impedance inductor may suppress loss mechanisms.

In some embodiments, the non-linear coupling of the nano-mechanical resonators may be given by $g_2 \hat{a}^2 \hat{b}^\dagger$+h.c., where $g_2$ is a coupling rate between a storage mode (a) and a dump mode (b). In some embodiments, the non-linearity may be implemented using an asymmetrically threaded SQUID (superconducting quantum interference device), also referred to herein as an "ATS." The ATS may comprise a superconducting quantum interference device (SQUID) that has been split approximately in the middle by a linear inductor. In its most general form, the ATS potential is given by the following equation:

$$U(\hat{\phi}) = \frac{1}{2} E_{L,b} \hat{\phi}^2 - 2E_j \cos(\phi_\Sigma)\cos(\hat{\phi} + \phi_\Delta) + 2\Delta E_j \sin(\phi_\Sigma)\sin(\hat{\phi} + \phi_\Delta)$$

In the above equation, $\hat{\phi}$ is the phase difference across the ATS, $\phi_\Sigma := (\phi_{ext,1} + \phi_{ext,2})/2$, $\phi_\Delta := (\phi_{ext,1} - \phi_{ext,2})/2$, and $\phi_{ext,1}$ ($\phi_{ext,2}$) is the magnetic flux threading the left (right) loop, in units of the reduced magnetic flux quantum $\phi_0^2 = h/2E$. Here $$E_{L,b} = \Phi_0^2/L_b;$$

$$E_j = (E_{j,1} + E_{j,2})/2; \text{ and}$$

$$\Delta E_j = \frac{(E_{j,1} - E_{j,2})}{2}$$

is the junction asymmetry. This ATS potential can be further simplified by tuning $\phi_\Sigma$ and $\phi_\Delta$ with two separate flux lines. For example, FIG. 1A illustrates ATS 102 included in control circuit 100, wherein ATS 102 includes separate flux lines 108 and 110. Note that FIG. 1A includes ATS 102 in control circuit 100 and also an enlarged depiction of ATS 102 adjacent to control circuit 102 that shows ATS 102 in more detail. The flux lines may be set such that:

$$\phi_\Sigma = \frac{\pi}{2} + \epsilon_p(t) \text{ and}$$

$$\phi_\Delta = \frac{\pi}{2}$$

In the above equations, $\epsilon_p(t) = \epsilon_{p,0} \cos(\omega_p t)$ is a small alternating current (AC) component added on top of the direct current (DC) basis. At this bias point, and assuming that $|\epsilon_p(t)| \ll 1$ then the equation above for $U(\hat{\phi})$ can be reduced to:

$$U(\hat{\phi}) = \frac{1}{2} E_{L,b} \hat{\phi}^2 - 2E_j \epsilon_p(t) \sin(\hat{\phi}) + 2\Delta E_j \cos(\hat{\phi}).$$

Figure 1B:
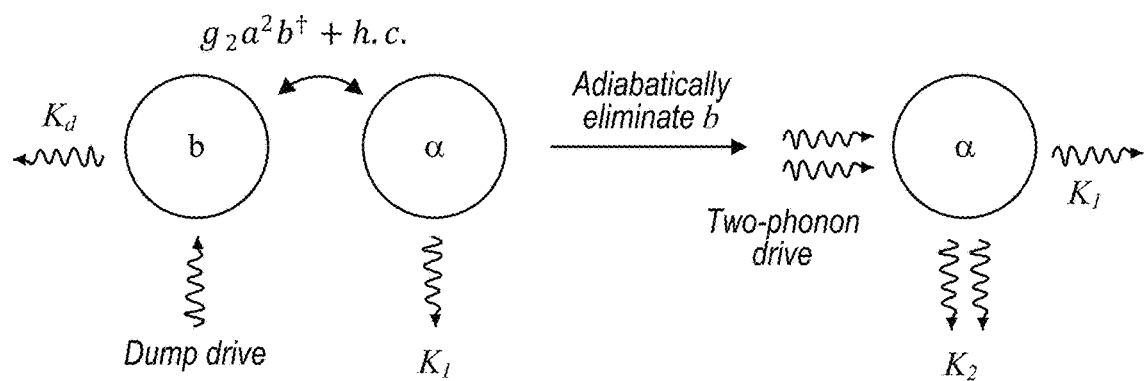
FIG. 1B illustrates a modeling of a storage mode (a) and a dump mode (b) of a resonator, wherein for large energy decay rates ($K_b$) that are significantly larger than a two-phonon coupling rate ($g_2$) the dump mode can be adiabatically eliminated, such that the resonator can be modeled as having a single phonon decay rate ($K_1$) and being driven by a two-phonon drive having a two-phonon decay rate ($K_2$), according to some embodiments.

Using the control circuit 100 shown in FIG. 1A, quantum information may be stored in a state of a linear mechanical resonator. For example, quantum information may be stored in storage mode 106. The stored quantum information may also be autonomously error corrected by way of artificially induced two-phonon driving and two-phonon decay controlled by the ATS. These two phonon processes are induced through the non-linear interaction $g_2 \hat{a}^2 \hat{b}^\dagger$+h.c. between the storage mode a and an ancillary mode b, called the dump, such as dump mode 104 shown in FIG. 1A. The dump mode is designed to have a large energy decay rate $K_d$ so that it rapidly and irreversibly "dumps" the photons it contains into the environment. If $K_d$ is much larger (e.g., ~10× or more) than the coupling rate $g_2$, then the dump mode can be adiabatically eliminated from the Hamiltonian, for example as shown in FIG. 1B. For example, as shown on the right side of FIG. 1B, the emission of phonon pairs via $g_2 \hat{a}^2 \hat{b}^\dagger$ can be accurately modeled as a dissipative process described by a dissipator ~D[$a^2$]. Additionally, if the dump mode is linearly driven as $\epsilon^* b e^{-\omega_d t}$+h.c. this provides the required energy to stimulate the reverse process $g^*_2(a^{+2})b$, which in the adiabatic elimination, as shown in FIG. 1B, can be modeled as an effective two-phonon drive. Altogether, the dynamics can be accurately modeled through the equation:

$$\frac{d\rho}{dt} = K_2 D[a^2 - \alpha^2], \text{ where } \alpha = \epsilon/g_2 \text{ and } k_2 = 4g_2^2/K_d$$

The steady states of the dynamics of the system shown in FIG. 1B are the coherent states $|\alpha\rangle$, $|-\alpha\rangle$, or any arbitrary superposition of the two. This protected subspace can be used to encode a qubit through the following definition of a logical basis: $|0_L\rangle = |\alpha\rangle$, $|1_L\rangle = |-\alpha\rangle$. Qubits encoded in this way are effectively protected from X errors (e.g., bit flips) because the bit-flip rate decays exponentially with the code distance $|\alpha|^2$, as long as $K_2|\alpha|^2 \gg K_1$, wherein $K_1$ is the ordinary (e.g., single-photon) decay rate of the storage mode. Since $|\alpha|^2 \sim 1$, this condition is generally equivalent to $K_2/K_1 \gg 1$. However, Z errors (e.g., phase flips) may not be protected by this code.

As discussed above, an ATS is formed by splitting a SQUID with a linear inductor. The magnetic flux threading of each of the two resulting loops of the ATS can be controlled via two nearby on-chip flux lines, such as flux lines 108 and 110 shown in FIG. 1A. These flux lines can be tuned to appropriate values and can send radio frequency (rf) signals at appropriate frequencies for a desired non-linear interaction to be resonantly activated in the nano-mechanical resonator. The dump mode 104, may further be strongly coupled to a dump line of characteristic impedance $Z_0$, which induces a large energy decay rate as required.

In some embodiments, the nano-mechanical storage resonator (e.g., storage 106) may be a piezoelectric nano-mechanical resonator that supports resonances in the GHz range. These resonances may be coupled to superconducting circuits of the control circuit 100 via small superconducting electrodes (e.g., terminals) that either directly touch or closely approach the vibrating piezoelectric region of the nano-mechanical resonators. The values of the nonlinear coupling rate $g_2$, the two-phonon dissipation rate $k_2$, and the ratio $K_2/K_1$ can be calculated as follows:

First, compute the admittance $Y_m(\omega)$ seen at the terminals of the nano-mechanical resonator using a finite element model solver. Next, find an equivalent circuit using a Foster synthesis algorithm (further discussed below). Then, diagonalize the combined circuit and compute the zero-point phase fluctuations $\phi_{a,zp}$ and $\phi_{b,zp}$. Furthermore, compute the dissipation rates $k_b$ and $k_1$ of the eigenmodes. Next compute $$g_2 = \left(\frac{E_j}{h}\right) \epsilon_0 \phi_{a,zp}^2 \phi_{b,zp}^2 / 2.$$

Also, compute $k_2 = 4g_2^2/k_d$.

In some embodiments, a nano-mechanical element, such as the nano-mechanical resonator that implements storage mode 106 and dump mode 104 may be represented as an equivalent circuit that accurately captures its linear response. This can be done using Foster synthesis if the admittance $Y_m(\omega)$ seen from the terminals of the mechanical resonator is known. For example, the admittance may be computed using finite element modeling. In some embodiments, a Foster network may be used to accurately represent a one-dimensional (e.g., linear) phononic-crystal-defect resonator (PCDR), which may be a type of nano-mechanical resonator used in some embodiments. In some embodiments, the dump resonator may be modeled as having a fixed impedance, such as 1 kilo ohms.

Figure 2:
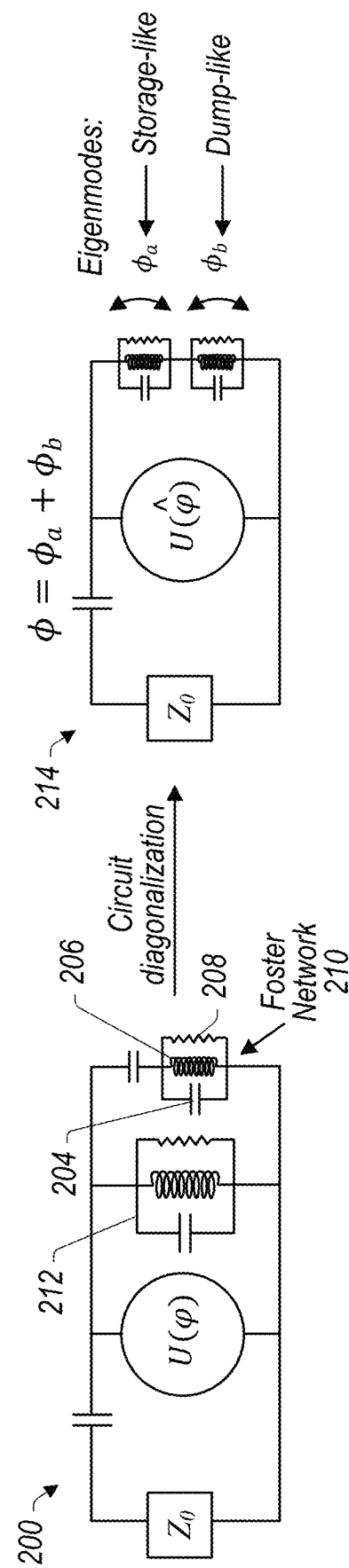
FIG. 2 illustrates a Foster network representing a one-dimensional phononic-crystal-defect resonator (PCDR), according to some embodiments.

For example, FIG. 2 illustrates a version of control circuit 100 that has been represented using a Foster network (e.g., equivalent circuit 200). In its simplest form, equivalent circuit 200 may be represented as 'a DC capacitance' in series with an LC block (e.g., L represents an inductor and C represents a capacitor for the LC block), wherein an additional resistor is inserted to include the effects of the loss in the resonator. For example, Foster network 210 is modeled to include capacitor 204, inductor 206, and resistor 208. The linear part of the dump resonator (including the inductor that splits the ATS) can also be represented as an LC block, such as LC block 212. In this representation the dump resonator (e.g., 212) and the storage resonator (e.g., 210) are represented as two linear circuits with a linear coupling and can therefore be diagonalized by a simple transformation of coordinates. For example, FIG. 2 illustrates a diagonalized circuit representation 214. The resulting "storage-like" (â) and "dump-like" ($\hat{b}$) eigenmodes both contribute to the total phase drop across the ATS. For example, $\hat{\phi}=\varphi_a(\hat{a}+\hat{a}^\dagger)+\varphi_b(\hat{b}+\hat{b}^\dagger)$. These modes therefore mix the via the ATS potential, which may be redefined as $U(\hat{\phi}) \rightarrow U(\hat{\phi})-E_{L,b}\hat{\phi}^2/2$ because the inductor has already been absorbed into the linear network. The zero-point phase fluctuations of each mode are given by:

$$\varphi_{k,j} = \sqrt{\frac{h}{2\omega_k}}\left(C^{-1/2}U\right)_{jk}$$

In the above equation C is the Maxwell capacitance matrix of the circuit. U is the orthogonal matrix that diagonalizes $C^{-1/2}L^{-1}C^{-1/2}$, where $L^{-1}$ is the inverse inductance matrix. The index $k\in\{a, b\}$ labels the mode and j labels the node in question. Note that in some instances as described herein the notation of j may be omitted because it is clear from context, e.g., the node of interest is the one right above the ATS.

The way in which the ATS mixes the modes is explicit given the third-order term in the Taylor series expansion of the $\sin(\hat{\phi})$ contains terms of the form $\hat{a}^2\hat{b}^\dagger+h.c.$, which is the required coupling. This is a reason for using the ATS as opposed to an ordinary junction, which has a potential $\sim\cos(\hat{\phi})$.

For analysis the pump and drive frequencies may be set to $\omega_p=2\omega_a-\omega_b$, and $\omega_d=\omega_b$. This brings the terms $g_2\hat{a}^2\hat{b}^\dagger+h.c.$ into resonance allows the other terms in the rotating wave approximation (RWA) to be dropped. The coupling is given by $g_2=\epsilon_0 E_j\varphi_a^2\varphi_b/2h$. Additionally, a linear drive $\epsilon^*_d\hat{b}+h.c.$ at frequency $\omega_d=\omega_b$ is added to supply the required energy for the two-photon drive.

Symmetric ATS Arrangements

Referring back to the equation above which describes the Hamiltonian interactions for a single ATS control circuit:

$$U(\phi) = \frac{1}{2}E_{L,b}\hat{\phi}^2 - 2E_j\epsilon_p(t)\sin(\hat{\phi}) + 2\Delta E_j\cos(\hat{\phi}).$$

The middle term in the equation ($-2E_j\epsilon_p(t)\sin(\hat{\phi})$) corresponds to the energy of the junctions in the ATS, e.g., junctions 112 and 114 as illustrated in FIG. 1A. The first term $$\left(\frac{1}{2}E_{L,b}\hat{\phi}^2\right)$$

corresponds to the energy of the inductor, e.g., inductor 116 as illustrated in FIG. 1A. The last term ($2\Delta E_j \cos(\hat{\phi})$) corresponds to errors that may arise due to fabrication defects for the ATS, but in theory may be zero. The following discussion relates to the middle term that corresponds to the energy of the junctions.

This middle term can be re-written in terms of a storage mode ($\hat{\phi}_a$) and a dump mode ($\hat{\phi}_b$). Then the middle term becomes $-2E_j\epsilon_p(t)\sin((\hat{\phi}_1)=-2E_j\epsilon_p(t)\sin(\hat{\phi}_a+\hat{\phi}_b)$, wherein $\hat{\phi}_1=\hat{\phi}_a+\hat{\phi}_b$. This can be summarized as a $(\hat{\phi}_a+\hat{\phi}_b)^3$ term. This can then be approximated as:

$$\approx g_2\left((\hat{a}^2-\alpha^2)\hat{b}^\dagger + h.c.\right) \ldots\ldots \left(e.g., a\phi_a^2\phi_b \text{ term}\right) +$$

$$g_2\left(\frac{\varphi_b}{\varphi_a}\right)\left(\hat{a}^\dagger\hat{b}^2 e^{3i(\omega_a-\omega_b)t} + h.c. + \ldots\right) \ldots\ldots \left(e.g., a\phi_a\phi_b^2 \text{ term}\right) +$$

$$g_2\left(\frac{\varphi_b}{\varphi_a}\right)^2\left((\hat{b}^\dagger\hat{b}^2+\hat{b})e^{2i(\omega_a-\omega_b)t} + h.c. + \ldots\right) \ldots\ldots \left(e.g., a\phi_b^3 \text{ term}\right).$$

Figure 3:
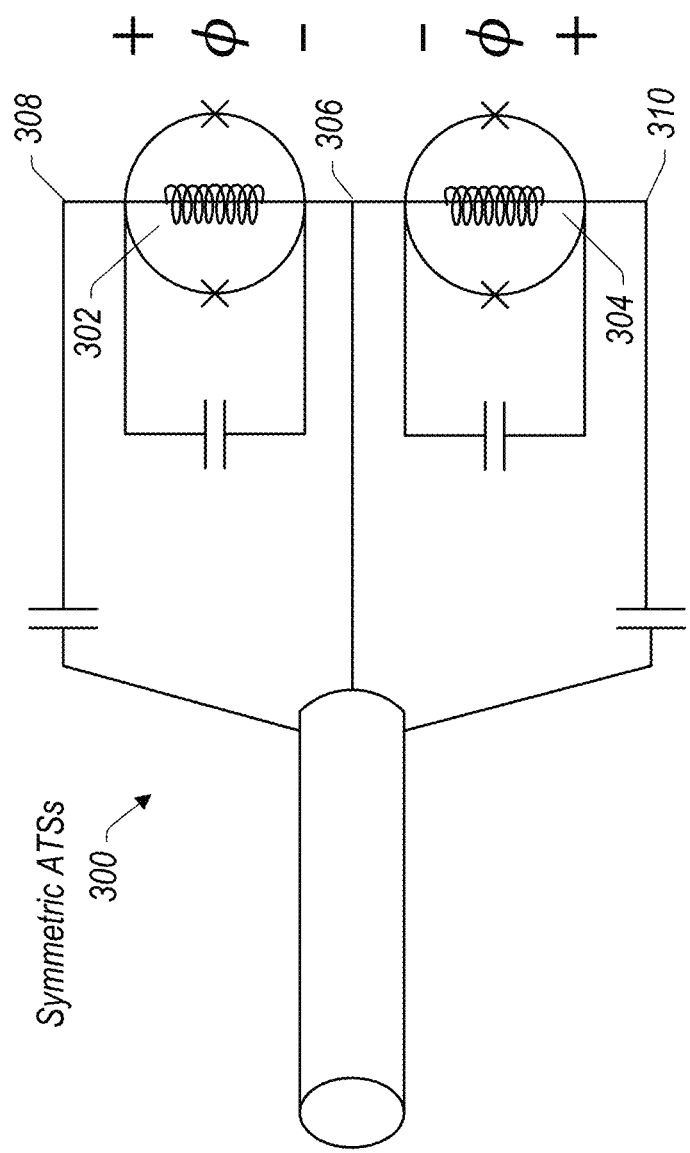
FIG. 3 illustrates symmetric ATSs that may be used to stabilize a resonator, wherein the symmetrically arranged ATSs cancel out undesirable Hamiltonian interactions generated by the respective ATSs individually, according to some embodiments.

In order to reduce the terms in the Hamiltonian, symmetry selection can be used. For example, when two symmetric ATS are used as shown in FIG. 3, e.g., ATS 302 and ATS 304, wherein the ATSs are arranged such that the negative potentials share a common node 306 and the positive potentials 308 and 310 are symmetric about the shared negative node 306, the control circuit has two of the terms representing the energy of the junctions of the two ATSs 302 and 304, such that:

$U(\phi_1,\phi_2)=-2E_j\epsilon_p(t)\sin(\phi_1)-2E_j\epsilon_p(t)\sin(\phi_2)$, where $\phi_1=\phi+\phi_\Sigma$ and $\phi_2=\phi-\phi_\Sigma$. Then substituting in the respective values for $\phi_1$ and $\phi_2$ yields:

$U(\phi_1,\phi_2)=-2E_j\epsilon_p(t)\sin(\phi+\phi_\Sigma)-2E_j\epsilon_p(t)\sin(\phi-\phi_\Sigma)$, This can then be written as:
$-4E_j\epsilon_p(t)\sin(\phi)\cos(\phi_\Sigma)$, which is approximately equivalent to $(\phi-\phi^3/6)(1-\phi_\Sigma^2/2)$.

Substituting $\phi_a$ for $\phi_\Sigma$ and $\phi_b$ for $\phi$ and multiplying out the terms in the two sets of parentheticals yields terms comprising $\phi_a$, $\phi_b$, $\phi_a^2\phi_b$, $\phi_a\phi_b^2$, $\phi_b^3$, $\phi_a^3$. However, due to the subtractions, the terms $\phi_a$, $\phi_a\phi_b^2$ and $\phi_a^3$ cancel each other out. Thus, these undesirable terms are eliminated when a symmetric ATS is used as shown in FIG. 3.

Figure 4A:
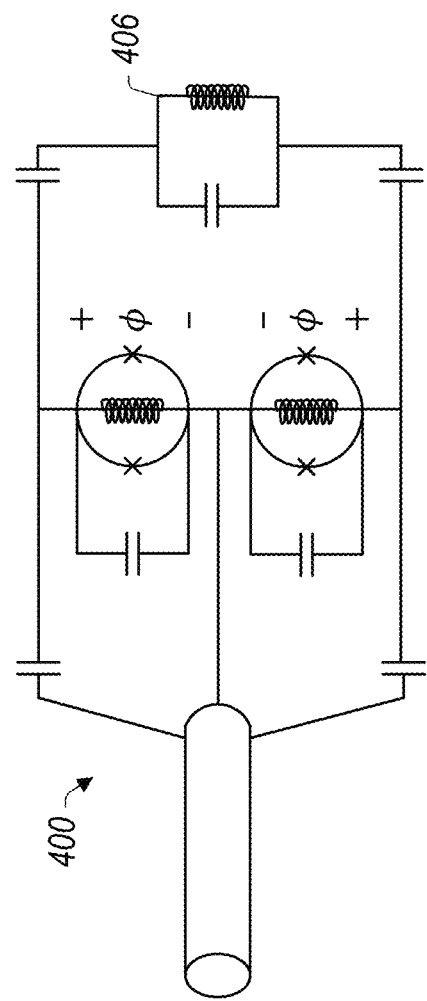
FIG. 4A illustrates the symmetric ATSs coupled to a resonator, according to some embodiments.
Figure 4B:
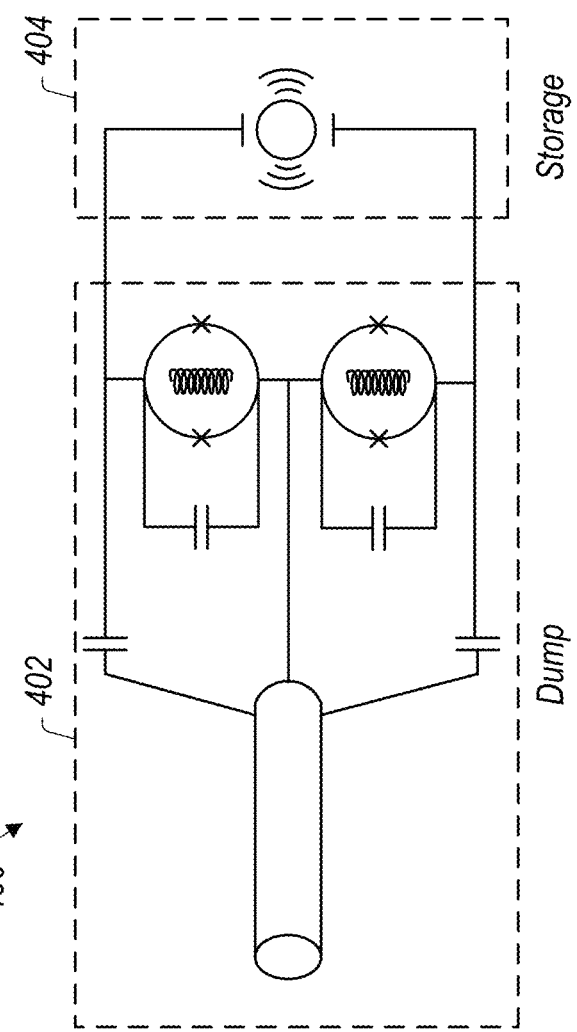
FIG. 4B illustrates a storage mode and a dump mode implemented using the symmetric ATS, according to some embodiments.

For example, FIG. 4 shows a control circuit 400 comprising symmetric ATSs similar to the symmetric ATSs of the control circuit shown in FIG. 3. In FIG. 4 the control circuit comprising symmetric ATSs is also coupled to resonator 406. As shown in FIG. 4B this implements a dump mode 402 and a storage mode 404. However, in contrast to the dump mode and the storage modes of a single ATS, for example as shown in FIG. 1. The above unwanted Hamiltonian terms (e.g., $\phi_a$, $\phi_a\phi_b^2$ and $\phi_a^3$) are eliminated. Moreover, because the $g_2$ coupling is given by $g_2\hat{a}^2\hat{b}^\dagger$+h.c., increasing $g_2$ had an effect of increasing $\phi_b$, which resulted in adverse interactions when a $\phi_a\phi_b^2$ term was present in the single ATS arrangement. This is because as $\phi_b$ increased with increasing $g_2$ the undesirable $\phi_a\phi_b^2$ term also increased as the square of $\phi_b$. However, in the symmetric ATS arrangement, wherein the $\phi_a\phi_b^2$ terms cancel each other out, this limitation on increasing the $g_2$ coupling is eliminated.

Figure 5B:
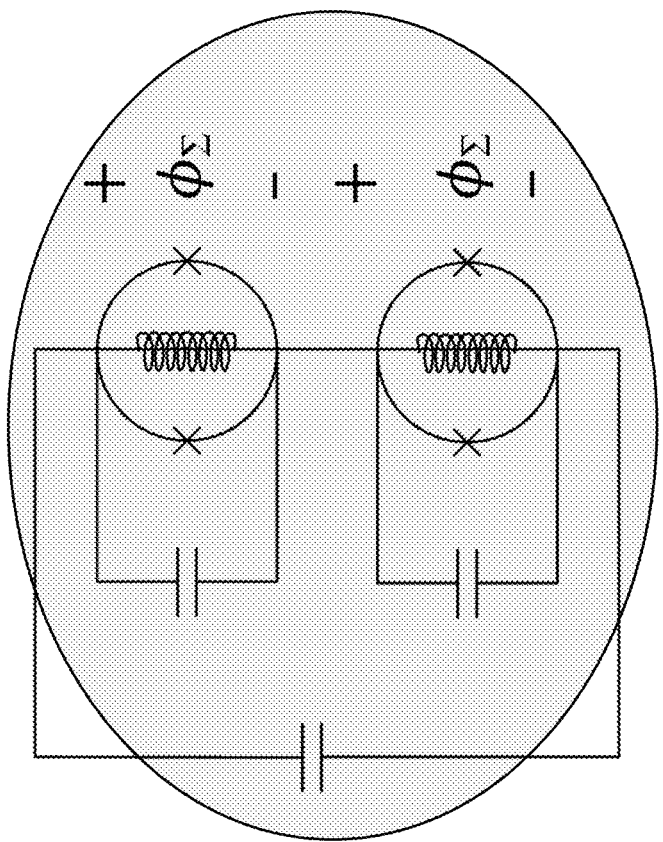
FIGS. 5A and 5B, further illustrate how the symmetric and anti-symmetric modes of the symmetrically arranged ATSs function as storage-like modes and dump-like modes, according to some embodiments.
Figure 5A:
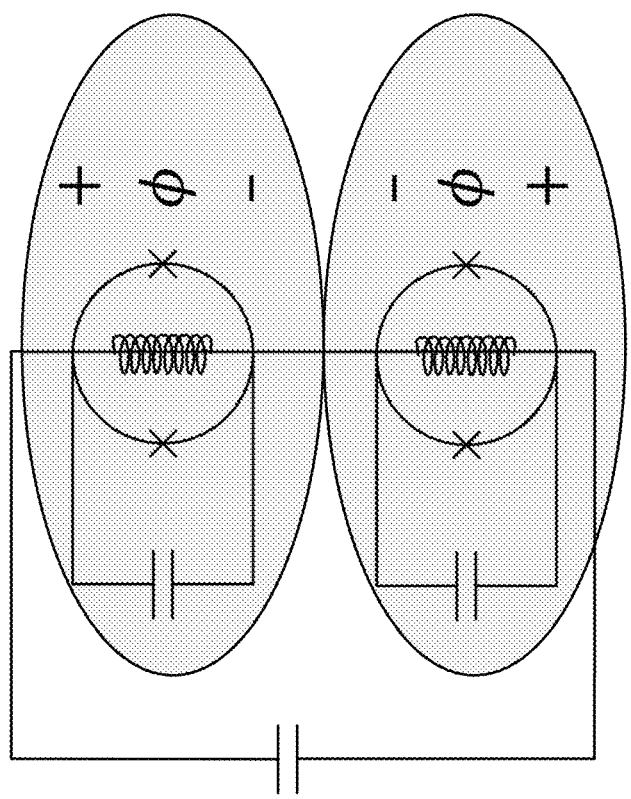

As yet another example, FIGS. 5A and 5B illustrates a same symmetric ATS control circuit that implements a symmetric storage like mode and an anti-symmetric dump like mode.

Multi-Mode Stabilization/ATS Multiplexing

In some embodiments, the scheme as described above may be extended to be used in a multi-mode setting, in which N>1 storage resonators are simultaneously coupled to a single dump +symmetric ATS. This may allow for the cat subspaces of each of the storage modes to be stabilized individually. For example, a dissipator of the form $\Sigma_n D[a_n^2 - \alpha^2]$. However, in order to avoid simultaneous or coherent loss of phonons from different modes (which fails to stabilize the desired subspaces), an incoherent dissipator is required. This can be achieved if the stabilization pumps and the drives for the different modes are purposefully detuned. For example, in the context of a single ATS, the Hamiltonian is given by:

$$H = \Sigma_m(\epsilon^{*(d)}_m(t)b^\dagger + \text{h.c.}) + \Sigma_{m,i,j}(g^{*(m)}_{ij}(t)a_ia_jb^\dagger + \text{h.c.}),$$
where $\epsilon^{*(d)}_m(t) = \epsilon^{*(d)}_m e^{i\Delta_m t}$ and $g^{*(m)}_{ij}(t) = g^*_2 e^{i(2\omega_m - \omega_i + \Delta_m)t}$ However, this Hamiltonian can also be adapted to describe symmetric ATSs. In the above equation $\omega_m^{(p)} = 2\omega_m - \omega_b + \Delta_m$ and $\omega_m^{(d)} = \omega_b - \Delta_m$ are the pump and drive frequencies for mode m. By detuning the pumps, the pump operators of different modes can rotate with respect to each other. If the rotation rate is larger than $k_2$ then the coherences of the form $a_i^2 \rho(a_j^\dagger)$ in the Lindbladian vanish in a time averaged sense. The drive de-tunings allow the pumps and drives to remain synchronized even though the pumps have been detuned relative to one another.

In some embodiments, the modes $a_1$ and $a_2$ may be simultaneously stabilized using a multiplexed symmetric ATS, wherein the pumps have been detuned. Simulations may be performed to determine the detuning parameters using the simulated master equation, as an example:

$$\dot{\rho} = -i\left[\frac{\Delta}{2}a_1^\dagger a_1 + (\epsilon_2 e^{i\Delta t}a_1^{\dagger 2} + \epsilon_2 a_2^{\dagger 2} + \text{h.c.}), \rho\right] + k_2 D[a_1^2 + a_2^2](\rho)$$

Bandwidth Limits

The above-described tuning works best when the detuning $\Delta$ is relatively small as compared to $k_b$. This is due to the fact that, unlike the single-mode case, where $k_2 = 4g_2^2/k_b$, the two-phonon decay of the multi-mode system is given by:

$$k_{2,n} = \frac{4|g|^2}{k_b} \frac{1}{1 + 4(\Delta_n/k_b)^2}$$

The Lorentzian suppression factor can be understood by the fact that photons/phonons emitted by the dump mode as a result of stabilizing mode n are emitted at a frequency $\omega_b + \Delta_n$ and are therefore "filtered" by the Lorentzian lineshape of the dump mode which has linewidth $k_b$. This sets an upper bound on the size of the frequency region that the de-tunings are allowed to occupy. Furthermore, in some embodiments, the de-tunings $\Delta_n$ may all be different from each other by an amount greater than $k_2$ in order for the dissipation to be incoherent. In a frequency domain picture, the spectral lines associated with emission of photons/phonons out of the dump must all be resolved. This, also sets a lower bound on the proximity of different tunings. As such, since an upper bound and lower bound are set, bandwidth limits for the de-tunings may be determined. Also, taking into account these limitations, an upper bound on the number of modes that can be simultaneously stabilized by a single dump can also be determined. For example, if de-tunings are selected to be $\Delta_n = n\Delta$, with $\Delta \sim k_2$, then the maximum number of modes that may be simultaneously stabilized may be limited as $N_{max} \sim k_b/\Delta \sim k_b/k_2$. As a further example, for typical parameters, such as $k_b/2\pi \sim 10$ MHz and $k_2/2\pi \sim 1$ MHz, this results in bandwidth limits that allow for approximately 10 modes to be simultaneously stabilized.

Figure 6:
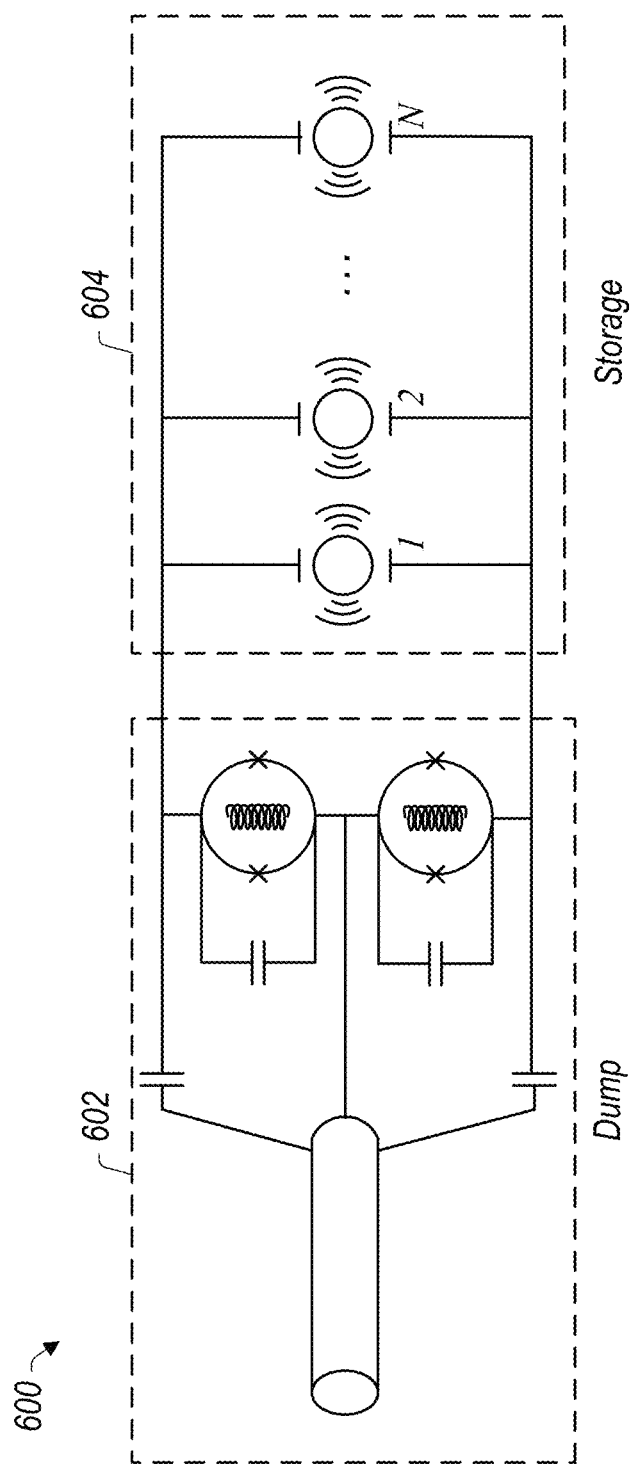
FIG. 6 illustrates a system comprising a plurality of resonators and symmetric ATSs that are configured to provide multi-mode stabilization to qubits implemented via the plurality of resonators, according to some embodiments.

For example, FIG. 6 illustrates a control circuit 600 that includes a single dump resonator 602 that stabilizes multiple storage resonators 604.

Use of a High-Impedance Inductor to Enhance Coupling Between a Dump Resonator and One or More Storage Resonators In some embodiments, the coupling rate $g_2$ may be increased by using a high impedance inductor. This is because $g_2$ depends strongly on the effective impedance $Z_d$ of the dump resonator. For example, $g_2 \sim Z_d^{5/2}$. Thus, in some embodiments, using a large inductor in the ATS may result in a large effective impedance $Z_d$. In some embodiments, the inductor chosen to be included in the ATS circuit may be sufficiently linear to ensure stability of the dump circuit when driven strongly during stabilization. For example, a high impedance inductor used may comprise a planar meander or double-spiral inductor, a spiral inductor with air bridges, an array with a large number of (e.g., greater than 50) highly transparent Josephson junction, or other suitable high impedance inductor.

Filtering in Multi-Mode Stabilization/Multiplexed ATS

Figure 7:
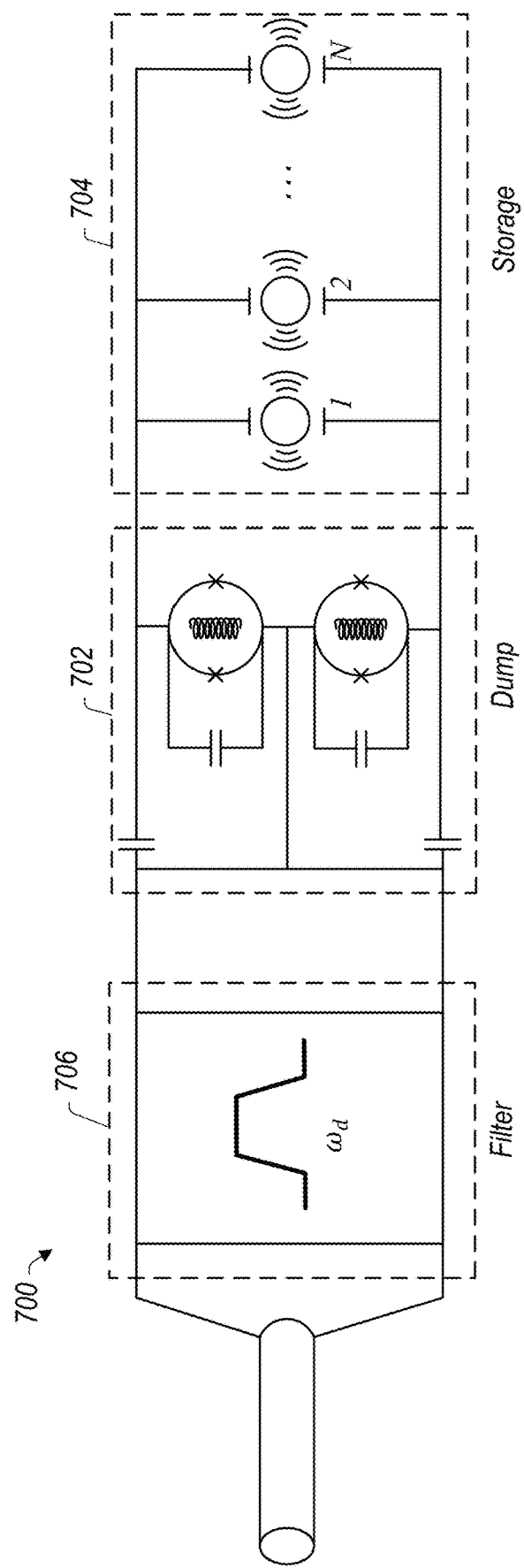
FIG. 7 illustrates a system comprising a plurality of resonators and symmetric ATSs that are configured to provide multi-mode stabilization to qubits implemented via the plurality of resonators, wherein a microwave filter suppresses correlated decay processes, according to some embodiments.

In some embodiments, microwave filters (e.g., metamaterial waveguides) may be used to alleviate the limitations with regard to bandwidth limits as discussed above. Such filters may also be used to eliminate correlated errors in multiplexed stabilization embodiments. For example, FIG. 7 illustrates control circuit 700 that includes a single dump resonator 702, multiple storage resonators 704, and a filter 706.

More specifically, when stabilizing multiple storage modes with the same dump resonator and symmetric ATSs, a number of cross-terms appear in the Hamiltonian that would otherwise not be there in the single-mode case. For example, these terms take the form of $g_2 a_j a_k b^\dagger e^{-i\nu t}$. After adiabatic elimination of the b mode (for example as discussed in regard to FIG. 1), these terms effectively become jump operators of the form $k_{2,eff} a_j a_k e^{-i\nu t}$. Unlike the desired jump processes $k_2$, $a_j^2$, which result in the individual stabilization of the cat subspace of each resonator, the correlated decay terms result in simultaneous phase flips of the resonators j and k. For example, these correlated errors can be damaging to the next layer of error correction, such as in a repetition or striped surface code.

In some embodiments, in order to filter out the unwanted terms in the physical Hamiltonian that give rise to effective dissipators that cause correlated phase flips, the de-tunings of the unwanted terms may be larger than half the filter bandwidth. This may result in an exponential suppression of the unwanted terms. Said another way, the de-tunings and filter may be selected such that detuning of the effective Hamiltonian is larger than half the filter bandwidth. Moreover, the filter mode (along with the dump mode) may be adiabatically eliminated from the model in a similar manner as discussed in FIG. 1B for the adiabatic elimination of the dump mode. This may be used to determine an effective dissipator for a circuit, such as control circuit 700, that includes both dump resonator 702 and filter 706.

As discussed above, correlated phase errors may be suppressed by a filter if the corresponding emitted photons have frequencies outside of the filter bandwidth. In some embodiments, all correlated phase errors may be simultaneously suppressed by carefully choosing the frequencies of the storage modes. For example, cost functions may be used taking into account a filter bandwidth to determine optimized storage frequencies. For example, in some embodiments a single ATS/dump may be used to suppress decoherence associated with all effective Hamiltonians for 5 storage modes. In such embodiments, all dominant sources of stochastic, correlated phase errors in the cat qubits may be suppressed.

Multi-Terminal Mechanical Resonators

In some embodiments, nano-mechanical resonators, such as those shown in FIGS. 1-7, may be designed with multiple terminals that allow a given nano-mechanical resonator to be coupled with more than one ATS/control circuit. For example, a single connection ATS may include a ground terminal and a signal terminal, wherein the signal terminal couples with a control circuit comprising an ATS. In some embodiments, a multi-terminal nano-mechanical resonator may include more than one signal terminal that allows the nano-mechanical resonator to be coupled with more than one control circuit/more than one ATS. For example, in some embodiments, a nano-mechanical resonator may include three or more terminals that enable the nano-mechanical resonator to be coupled with three or more ATSs. If not needed, an extra terminal could be coupled to ground, such that the multi-terminal nano-mechanical resonator functions like a single (or fewer) connection nano-mechanical resonator. In some embodiments, different signal terminals of a same nano-mechanical resonator may be coupled with different ATSs, wherein the ATSs may be used to implement gates between mechanical resonators, such as a CNOT gate. For example, this may allow for implementation of gates on the stabilizer function.

Example Physical Gate Implementations

Recall the Hamiltonian of a system comprising of multiple phononic modes $\hat{a}_k$ coupled to a shared ATS mode $\hat{b}$:

$$\hat{H} = \sum_{k=1}^{N} \omega_k \hat{a}_k^\dagger \hat{a}_k + \omega_b \hat{b}^\dagger \hat{b} - 2E_j \epsilon_p(t)\sin\left(\sum_{k=1}^{N} \hat{\phi}_k + \hat{\phi}_b\right)$$

wherein $\hat{\phi}_k \equiv \varphi_k(\hat{a}_k + \hat{a}_k^\dagger)$ and $\hat{\phi}_b \equiv \varphi_b(\hat{b} + \hat{b}^\dagger)$. Also, $\varphi_k$ and $\varphi_b$ quantify zero-point fluctuations of the modes $\hat{a}_k$ and $\hat{b}$. To simplify the discussion, neglect small frequency shifts due to the pump $\epsilon_p(t)$ for the moment and assume that the frequency of a mode is given by its bare frequency (in practice, however, the frequency shifts need to be taken into account; see below for the frequency shift due to pump).

Then, in the rotating frame where every mode rotates with its own frequency, the following is obtained:

$$\hat{H}_{rot} = -2E_j \epsilon_p(t)\sin\left(\sum_{k=1}^{N} \varphi_k \hat{a}_k e^{-\omega_k t} + h.c. + \varphi_b \hat{b} e^{-\omega_b t} + h.c.\right)$$

where $\varphi_k$ and $\varphi_b$ quantify zero-point fluctuations of the modes $\hat{a}_k$ and $\hat{b}$. Note that the rotating frame has been used where each mode rotates with its own frequency.

First, a linear drive on a phononic mode, say $\hat{a}_k$, can be readily realized by using a pump $\epsilon_p(t) = \epsilon_p \cos(\omega_p t)$ and choosing the pump frequency $\omega_p$ to be the frequency of the mode that is to be driven, that is, $\omega_p = \omega_k$. Then, by taking only the leading order linear term in the sine potential (e.g., $\sin(\hat{x}) \simeq \hat{x}$ we get the desired linear drive:

$$\hat{H}_{rot} = -2E_j \epsilon_p \varphi_k (\hat{a}_k + \hat{a}_k^\dagger) + H'$$

where H' comprises fast-oscillating terms such as $-E_j \epsilon_p (\varphi_l \hat{a}_l e^{-i(\omega_l - \omega_k)t} + h.c.)$ with $l \neq k$ and $E_j \epsilon_p (\varphi_b \hat{b} e^{-i(\omega_b - \omega_k)t} + h.c.)$ as well as other terms that rotate even faster. Since the frequency differences between different modes are on the order of 100 MHz but $|\epsilon_z|/(2\pi)$ is typically much smaller than 100 MHz, the faster oscillating terms can be ignored using a rotating wave approximation (RWA).

To avoid driving unwanted higher order terms, one may alternatively drive the phononic mode directly, at the expense of increased hardware complexity, instead of using the pump $\epsilon_p(t)$ at the ATS node.

Now moving on to the implementation of the compensating Hamiltonian for a CNOT gate. For example a compensating Hamiltonian for a CNOT gate may have the form:

$$\hat{H}_{CNOT} = \frac{\pi}{4\alpha T}(\hat{a}_1 + \hat{a}_1^\dagger - 2\alpha)(\hat{a}_2^\dagger \hat{a}_2 - \alpha^2)$$

Without loss of generality, consider the CNOT gate between the modes $\hat{a}_1$ (control) and $\hat{a}_2$ (target). Note that $\hat{H}_{CNOT}$ comprises an optomechanical coupling $$\frac{\pi}{4\alpha T}(\hat{a}_1 + \hat{a}_1^\dagger)\hat{a}_2^\dagger \hat{a}_2$$

between two phononic modes, a linear drive on the control mode $$-\left(\frac{\pi\alpha}{4T}\right)(\hat{a}_1 + \hat{a}_1^\dagger),$$

and a selective frequency shift of the target mode $$-\left(\frac{\pi}{2T}\right)\hat{a}_2^\dagger \hat{a}_2.$$

To realize the optomechanical coupling, one might be tempted to directly drive the cubic term $\hat{a}_1 \hat{a}_2^\dagger \hat{a}_2 + h.c.$ in the sine potential via a pump $\epsilon_p(t) = \epsilon_p \cos(\omega_p t)$. However, the direct driving scheme is not suitable for a couple of reasons: since the term $\hat{a}_1 \hat{a}_2^\dagger \hat{a}_2$ rotates with frequency $\omega_1$, the required pump frequency is given by $\omega_p = \omega_1$ which is the same pump frequency reserved to engineer a linear drive on the $\hat{a}_1$ mode. Moreover, the term $\hat{a}_1 \hat{a}_2^\dagger \hat{a}_2$ rotates at the same frequency as those of undesired cubic terms. Hence, even if the linear drive is realized by directly driving the phononic mode $\hat{a}_1$, one cannot selectively drive the desired optomechanical coupling by using the pump frequency $\omega_p=\omega_1$ due to the frequency collision with the other cubic terms.

In some embodiments, to overcome these frequency collision issues, the optomechanical coupling is realized by off-resonantly driving the term $(\hat{a}_1+\lambda)\hat{a}_2\hat{b}^\dagger$. For example, the fact that a time-dependent Hamiltonian $\hat{H}=\lambda\hat{A}\hat{b}^\dagger e^{i\Delta t}$ yields an effective Hamiltonian $\hat{H}_{eff}=(x^2/\Delta)\hat{A}^\dagger\hat{A}$ upon time-averaging is used assuming that the population of the $\hat{b}$ mode is small (e.g. $\hat{b}^\dagger\hat{b}\ll 1$) and the detuning $\Delta$ is sufficiently large. Hence given a Hamiltonian $\hat{H}=x(\hat{a}_1+\lambda)\hat{a}_2\hat{b}^\dagger e^{-\Delta t}=$h.c., this gives $$\hat{H}_{eff} = \frac{x^2\lambda}{\Delta}\left(\hat{a}_1 + \hat{a}_1^\dagger + \lambda + \frac{1}{\lambda}\hat{a}_1^\dagger\hat{a}_1\right)\hat{a}_2^\dagger\hat{a}_2$$

In particular, by choosing $\lambda=-2\alpha$, the optomechanical coupling can be realized as well as the selective frequency shift of the $\hat{a}_2$ mode, e.g. $\hat{H}_{eff}\propto(\hat{a}_1+\hat{a}_1^\dagger-2\alpha)\hat{a}_2^\dagger\hat{a}_2$ up to an undesired cross-Ker term $-\hat{a}_1^\dagger\hat{a}_1\hat{a}_2^\dagger\hat{a}_2/(2\alpha)$. In this scheme, the desired selectivity is achieved because the term $(\hat{a}_1+\lambda)\hat{a}_2\hat{b}^\dagger$ is detuned from other undesired terms such as $(\hat{a}_1+\lambda)\hat{a}_k\hat{b}^\dagger$ with $k\geq 3$ by a frequency difference $\omega_2-\omega_k$. Thus, the unwanted optomechanical coupling $(\hat{a}_1+\hat{a}_1^\dagger)\hat{a}_k^\dagger\hat{a}_2$ can be suppressed by a suitable choice of the detuning $\Delta$. It is remarked that the unwanted cross-Kerr term $\hat{a}_1^\dagger\hat{a}_1\hat{a}_2^\dagger\hat{a}_2$ can in principle be compensated by off-resonantly driving another cubic term $\hat{a}_1\hat{a}_2\hat{b}^\dagger$ with a different detuning $\Delta'\neq\Delta$.

Lastly, similar approaches as used in the compensating Hamiltonian for the CNOT gate can also be used for a compensating Hamiltonian for a Toffoli gate.

Example Processes for Implementing an ATS-Phononic Hybrid System

Figure 8:
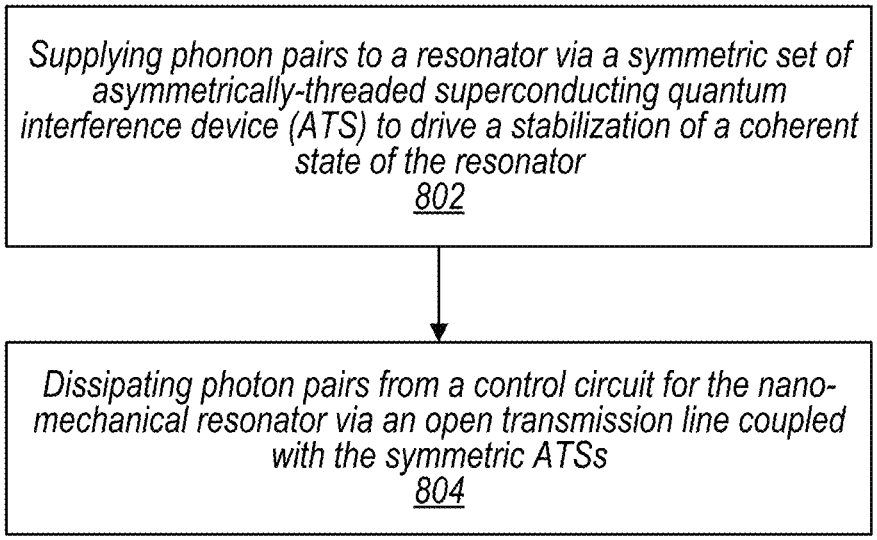
FIG. 8 illustrates a process of stabilizing a nano-mechanical resonator using symmetric ATSs, according to some embodiments.

FIG. 8 illustrates a process of stabilizing a resonator using a symmetric asymmetrically-threaded superconducting quantum interference devices (ATSs), according to some embodiments.

At block 802, a control circuit of a system comprising one or more resonators causes phonon pairs to be supplied to the nano-mechanical resonator via symmetric ATSs to drive a stabilization of a storage mode of the resonator such that the storage mode is maintained in a coherent state. Also, at block 804, the control circuit dissipates phonon/photon pairs from the resonator via an open transmission line of the control circuit that is coupled with the resonator and the symmetric ATSs.

Figure 9:
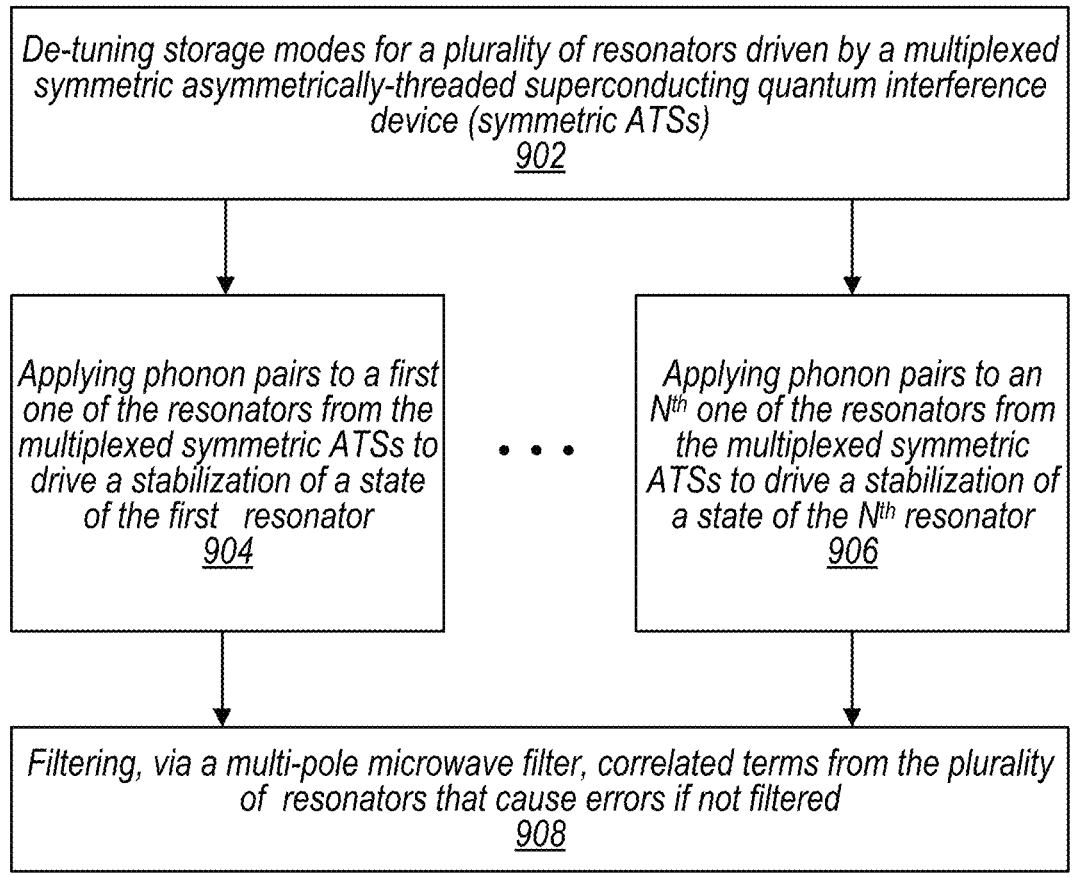
FIG. 9 illustrates a process of stabilizing multiple resonators using a multiplexed set of symmetric ATSs, according to some embodiments.

FIG. 9 illustrates a process of stabilizing resonators using a multiplexed symmetric ATSs, according to some embodiments.

At block 902, storage modes for a plurality of resonators that are to be driven by a multiplexed symmetric ATSs are chosen such that the storage modes are de-tuned. For example, block 902 may include detuning storage modes supported by a plurality of resonators from a dump resonator containing a symmetric asymmetrically-threaded superconducting quantum interference devices. At block 904 phonon pairs are supplied to a first one of the resonators at a first frequency and at block 906 phonon pairs are supplied to other ones of the resonators at other frequencies such that the frequencies for the respective storage modes of the resonators are de-tuned. For example, blocks 904 and 906 may include applying a pump and drive to symmetric ATSs to activate two-phonon driven-dissipative stabilization to a first one of the resonators and suppressing, via a microwave bandpass filter, correlated decay processes from the plurality of resonators.

Additionally, the storage mode frequencies and a bandwidth for a filter of the control circuit may be selected such that de-tunings of unwanted terms are larger than half the filter bandwidth. Then, at block 908 a microwave filter with the determined filter bandwidth properties may be used to filter correlated decay terms from the plurality of nano-mechanical resonators.

Illustrative Computer System

Figure 10:
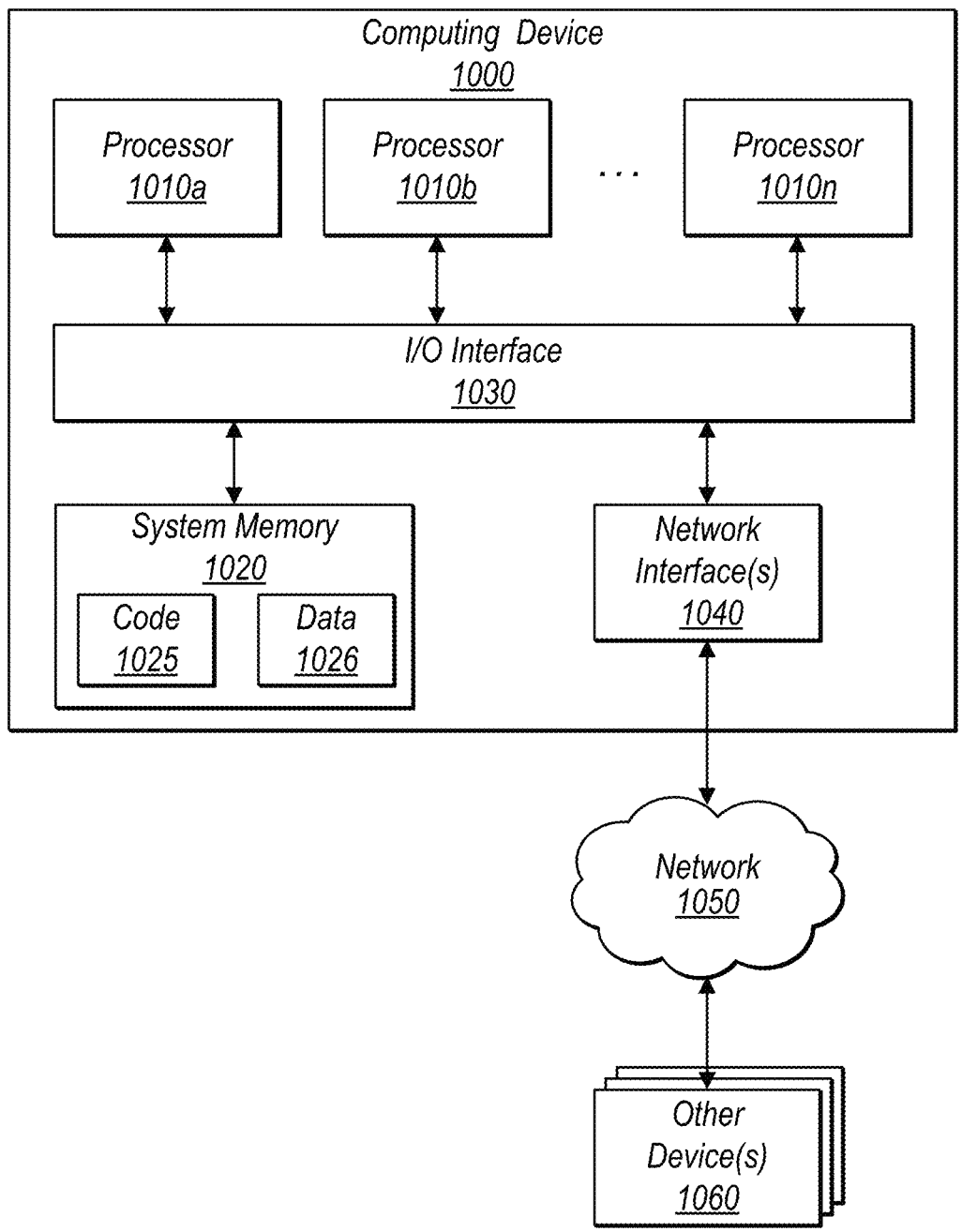
FIG. 10 is a block diagram illustrating an example computing device that may be used in at least some embodiments.

FIG. 10 is a block diagram illustrating an example computing device that may be used in at least some embodiments.

FIG. 10 illustrates such a general-purpose computing device 1000 as may be used in any of the embodiments described herein. In the illustrated embodiment, computing device 1000 includes one or more processors 1010 coupled to a system memory 1020 (which may comprise both non-volatile and volatile memory modules) via an input/output (I/O) interface 1030. Computing device 1000 further includes a network interface 1040 coupled to I/O interface 1030.

In various embodiments, computing device 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some implementations, graphics processing units (GPUs) may be used instead of, or in addition to, conventional processors.

System memory 1020 may be configured to store instructions and data accessible by processor(s) 1010. In at least some embodiments, the system memory 1020 may comprise both volatile and non-volatile portions; in other embodiments, only volatile memory may be used. In various embodiments, the volatile portion of system memory 1020 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1020 as code 1025 and data 1026.

In some embodiments, I/O interface 1030 may be configured to coordinate I/O traffic between processor 1010, system memory 1020, and any peripheral devices in the device, including network interface 1040 or other peripheral interfaces such as various types of persistent and/or volatile storage devices. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other devices 1060 attached to a network or networks 1050, such as other computer systems or devices. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1000 via I/O interface 1030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1000 as system memory 1020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 1040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more resonators; and
a control circuit coupled with the one or more resonators, the control circuit comprising:
two or more symmetrically arranged asymmetrically-threaded superconducting quantum interference devices (ATSs),
wherein the control circuit is configured to:
excite phonons in the one or more resonators by driving a storage mode of the one or more resonators; and
dissipate phonons from the one or more resonators via an open transmission line coupled to the control circuit configured to absorb photons from a dump mode of the control circuit, and
wherein respective junctions of the symmetrically arranged ATSs are arranged such that for a symmetric mode:
a first set of junctions of a first one of the ATSs connect on a first side to a positive phase difference potential node and connect on a second side to a negative phase difference potential node; and
a second set of junctions of a second one of the ATSs connect on another first side to another positive phase difference potential node and connect on another second side to a same negative phase difference potential node as the junctions of the first one of the ATSs.

2. The system of claim 1, wherein the symmetrically arranged ATSs are arranged such that Hamiltonian interactions across the first set of junctions and Hamiltonian interactions across the second set of junctions generate positive and negative $\phi_a \phi_b^2$ terms that cancel each other out, wherein $\phi_a$ is a potential for a storage like eigenmode, and wherein $\phi_b$ is a potential for a dump like eigenmode.

3. The system of claim 2, wherein the symmetrically arranged ATSs are arranged such that Hamiltonian interactions across the first set of junctions and Hamiltonian interactions across the second set of junctions generate positive and negative $\phi_a$ terms that cancel each other out.

4. The system of claim 3, wherein the symmetrically arranged ATSs are arranged such that Hamiltonian interactions across the first set of junctions and Hamiltonian interactions across the second set of junctions generate positive and negative $\phi_a^3$ terms that cancel each other out.

5. The system of claim 2, wherein the phonons are excited in the one or more resonators and dissipated from the one or more resonators in pairs comprising two phonons.

6. The system of claim 1, wherein the excitation and dissipation of the phonon pairs is induced via a non-linear interaction between the storage mode of the one or more resonators and the dump mode of the control circuit, wherein a square of the storage mode of the resonator is coupled to the dump mode of the control circuit via a two-phonon coupling rate ($g_2$), and wherein a decay rate at which photons are absorbed via the open transmission line is approximately ten times or greater than the coupling rate ($g_2$).

7. The system of claim 4, wherein elimination of the $\phi_a \phi_b^2$ term in the Hamiltonian interactions for the control circuit enables greater de-tuning of the dump and storage modes stabilized by the control circuit as compared to a control circuit with a single ATS or a control circuit with non-symmetric ATSs.

8. A method of stabilizing coherent state superpositions, the method comprising:
    exciting phonons by driving a storage mode; and
    dissipating phonons via an open transmission line coupled to a control circuit configured to absorb photons from a dump mode of the control circuit,
    wherein the control circuit comprises two or more symmetrically arranged asymmetrically-threaded superconducting quantum interference devices (ATSs).

9. The method of claim 8, wherein the symmetrically arranged ATSs are arranged such that Hamiltonian interactions across the first set of junctions and Hamiltonian interactions across the second set of junctions generate positive and negative $\phi_a \phi_b^2$ terms that cancel each other out,
    wherein $\phi_a$ is a potential for the overall control circuit, and
    wherein $\phi_b$ is a potential across an individual set of junctions of the first or second ATS.

10. The method of claim 9, wherein the symmetrically arranged ATSs are arranged such that Hamiltonian interactions across the first set of junctions and Hamiltonian interactions across the second set of junctions generate positive and negative $\phi_a$ terms that cancel each other out.

11. The method of claim 9, wherein the symmetrically arranged ATSs are arranged such that Hamiltonian interactions across the first set of junctions and Hamiltonian interactions across the second set of junctions generate positive and negative $\phi_a^3$ terms that cancel each other out.

12. The method of claim 8, wherein respective junctions of the symmetrically arranged ATSs are arranged such that for a symmetric mode:
    a first set of junctions of the first ATS connect on a first side to a positive phase difference potential node and connect on a second side to a negative phase difference potential node;
    a second set of junctions of the second ATS connect on another first side to another positive phase difference potential node connect on another second side to a same negative phase difference potential node as the junctions of the first ATS.

13. The method of claim 8, wherein the phonons are excited in a first resonator by driving the storage mode for the first resonator and the phonons are dissipated from the first resonator via the control circuit and the open transmission line, the method further comprising:
    causing phonons to be excited in one or more additional resonators by driving respective storage modes of the one or more additional resonators; and
    dissipating phonons from the one or more additional mechanical resonators via the open transmission line configured to absorb the photons from the dump mode of the control circuit,
    wherein the symmetric ATS is used to cause the phonons to be excited in the mechanical and the one or more additional resonators.

14. The method of claim 8, further comprising:
    filtering out, via one or more microwave filters, correlated decay or emission terms of storage modes of two or more of the resonators.

15. A system, comprising:
    two or more resonators; and
    a control circuit coupled with the two or more resonators, the control circuit comprising:
        two or more symmetrically arranged asymmetrically-threaded superconducting quantum interference devices (ATSs).

16. The system of claim 15, wherein respective junctions of the symmetrically arranged ATSs are arranged such that for a symmetric mode:
    a first set of junctions of a first one of the ATSs connect on a first side to a positive potential node and connect on a second side to a negative potential node;
    a second set of junctions of a second one of the ATSs connect on another first side to another positive potential node connect on another second side to a same negative potential node as the junctions of the first ATS.

17. The system of claim 15, wherein the symmetrically arranged ATSs are arranged such that Hamiltonian interactions across the first set of junctions and Hamiltonian interactions across the second set of junctions generate positive and negative $\phi_a \phi_b^2$ terms that cancel each other out,
    wherein $\phi_a$ is a potential for a storage like eigenmode, and
    wherein $\phi_b$ is a potential for a dump like eigenmode.

18. The system of claim 15, wherein the symmetrically arranged ATSs are arranged such that Hamiltonian interactions across the first set of junctions and Hamiltonian interactions across the second set of junctions generate positive and negative $\phi_a$ terms that cancel each other out,
    wherein $\phi_a$ is a potential for a storage like eigenmode, and
    wherein $\phi_b$ is a potential for a dump like eigenmode.

19. The system of claim 15, wherein the symmetrically arranged ATSs are arranged such that Hamiltonian interactions across the first set of junctions and Hamiltonian interactions across the second set of junctions generate positive and negative $\phi_a^3$ terms that cancel each other out,
    wherein $\phi_a$ is a potential for a storage like eigenmode, and
    wherein $\phi_b$ is a potential for a dump like eigenmode.

20. The system of claim 15, wherein the two or more resonators comprise:
    mechanical resonators; or
    electromagnetic resonators.

* * * * *